United States Patent
Fujimoto et al.

(10) Patent No.: US 9,808,792 B2
(45) Date of Patent: Nov. 7, 2017

(54) CATALYST FOR PRODUCING HYDROCARBON FROM SYNGAS, METHOD FOR PRODUCING CATALYST, METHOD FOR REGENERATING CATALYST, AND METHOD FOR PRODUCING HYDROCARBON FROM SYNGAS

(71) Applicant: NIPPON STEEL & SUMIKIN ENGINEERING CO., LTD., Tokyo (JP)

(72) Inventors: Kenichiro Fujimoto, Tokyo (JP); Noriyuki Yamane, Kimitsu (JP)

(73) Assignee: NIPPON STEEL & SUMIKIN ENGINEERING CO., LTD., Tokyo (JP)

(*) Notice: Subject to any disclaimer, the term of this patent is extended or adjusted under 35 U.S.C. 154(b) by 0 days.

(21) Appl. No.: 14/424,155

(22) PCT Filed: Aug. 19, 2013

(86) PCT No.: PCT/JP2013/072083
§ 371 (c)(1),
(2) Date: Feb. 26, 2015

(87) PCT Pub. No.: WO2014/034462
PCT Pub. Date: Mar. 6, 2014

(65) Prior Publication Data
US 2015/0209764 A1 Jul. 30, 2015

(30) Foreign Application Priority Data
Sep. 3, 2012 (JP) ................................ 2012-193221

(51) Int. Cl.
*B01J 23/96* (2006.01)
*B01J 21/08* (2006.01)
(Continued)

(52) U.S. Cl.
CPC .......... *B01J 23/8913* (2013.01); *B01J 21/08* (2013.01); *B01J 21/20* (2013.01); *B01J 23/96* (2013.01);
(Continued)

(58) Field of Classification Search
None
See application file for complete search history.

(56) References Cited

U.S. PATENT DOCUMENTS

| | | | | |
|---|---|---|---|---|
| 4,857,497 A * | 8/1989 | De Jong | .................. | B01J 23/89 502/242 |
| 6,262,132 B1 * | 7/2001 | Singleton | ................. | B01J 21/04 502/303 |

(Continued)

FOREIGN PATENT DOCUMENTS

| EP | 0500176 | 8/1992 |
|---|---|---|
| JP | 62-117630 | 5/1987 |

(Continued)

OTHER PUBLICATIONS

International Search Report dated Sep. 10, 2013 issued in corresponding PCT Application No. PCT/JP2013/072083.
(Continued)

*Primary Examiner* — Melvin C Mayes
*Assistant Examiner* — Colette Nguyen
(74) *Attorney, Agent, or Firm* — Andrews Kurth Kenyon LLP

(57) ABSTRACT

The present invention provides a catalyst for producing a hydrocarbon from a syngas, including one of a cobalt metal and a combination of a cobalt metal and cobalt oxides; zirconium oxides; and a noble metal; supported by a catalyst support mainly composed of silica, wherein a content of impurities in the catalyst is less than or equal to 0.15 mass %; a producing method and regenerating method thereof;
(Continued)

and a producing method of the hydrocarbon by using the catalyst.

22 Claims, 3 Drawing Sheets

(51) Int. Cl.
*B01J 23/89* (2006.01)
*B01J 38/10* (2006.01)
*C10G 2/00* (2006.01)
*B01J 21/20* (2006.01)
*B01J 37/02* (2006.01)

(52) U.S. Cl.
CPC ......... *B01J 37/0201* (2013.01); *B01J 38/10* (2013.01); *C10G 2/332* (2013.01); *C10G 2/333* (2013.01); *C10G 2/334* (2013.01); *C10G 2/342* (2013.01); *C10G 2/50* (2013.01)

(56) References Cited

U.S. PATENT DOCUMENTS

| | | | |
|---|---|---|---|
| 6,740,621 | B2 | 5/2004 | Singleton |
| 2006/0223693 | A1* | 10/2006 | Fujimoto ................. B01J 21/08 502/60 |
| 2007/0142483 | A1 | 6/2007 | White et al. |
| 2010/0240777 | A1* | 9/2010 | Fujimoto ................. B01J 21/08 518/700 |
| 2012/0108682 | A1 | 5/2012 | Saxton et al. |

FOREIGN PATENT DOCUMENTS

| | | |
|---|---|---|
| JP | 05-084444 | 4/1993 |
| JP | 2003-500188 | 1/2003 |
| JP | 2004-322085 | 11/2004 |
| JP | 2007-260669 | 10/2007 |
| JP | 2008-073687 | 4/2008 |
| JP | 2008-238096 | 10/2008 |
| WO | WO 00/71253 | 11/2000 |
| WO | 2008/023851 | 2/2008 |
| WO | 2011/061484 | 5/2011 |

OTHER PUBLICATIONS

R. Oukaci et al., Applied Catalysis A: Genaral, 186 (1999)129-144.
J. Chen, et al., Chinese Journal of Catalysis, vol. 21, 2000, p. 169-171.
Jong Wook Bae et al., Highly active and stable catalytic performance on phosphorous-promoted Ru/Co/Zr/SiO$_2$ Fischer-Tropsch catalyst, Catalysis Communications, Available online Mar. 15, 2010, vol. 11, pp. 834-838.
Notice of Allowance dated Mar. 15, 2016 issued in corresponding Japanese Application No. 2012-193221 [with English Translation].
Office Action dated Dec. 15, 2015 issued in corresponding Japanese Application No. 2012-193221.

* cited by examiner

CATALYST FOR PRODUCING HYDROCARBON FROM SYNGAS, METHOD FOR PRODUCING CATALYST, METHOD FOR REGENERATING CATALYST, AND METHOD FOR PRODUCING HYDROCARBON FROM SYNGAS

TECHNICAL FIELD

This application is a national stage application of International Application No. PCT/JP2013/072083, filed on Aug. 19, 2013, which claims priority to Japanese Patent Application No. 2012-193221, filed Sep. 3, 2012, each of which is incorporated by reference in its entirety.

The present invention relates to a catalyst for producing hydrocarbon from a so-called syngas mainly composed of carbon monoxide and hydrogen, a method for producing such a catalyst, a method for regenerating such a catalyst, and a method for producing hydrocarbon by using such a catalyst.

BACKGROUND ART

In recent years, environmental problems, such as global warming, have come to light. The importance of natural gas, which has high H/C ratio compared with other hydrocarbon fuels, coal, etc., can suppress the amount of carbon dioxide emissions, and also has rich reserves, has been reviewed. It is expected that the demand for natural gas will increase more and more in the future. Under such circumstances, there are many small and middle gas fields found in the regions of Southeast Asia. Oceania and so forth, which however are still left undeveloped due to their locations of distant places having no infrastructure such as a pipeline and an LNG plant, requiring a huge amount of investment for the infrastructure being in comparable to their minable reserves, so that their developments have been desired to be processed. As one of the effective developing means of the gas fields, after natural gas is converted into syngas, development of a technology of converting natural gas into syngas and then the syngas into liquid hydrocarbon fuels, such as kerosene and light oil, which are excellent in transportability and handling ability by using a Fischer-Tropsch (F-T) synthesis reaction is energetically performed in many places.

[Chemical Formula 1]

Chemical reaction formula of F-T synthetic reaction:

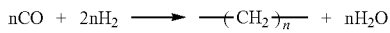

$$nCO + 2nH_2 \longrightarrow -(CH_2)_n- + nH_2O$$

This F-T synthesis reaction is an exothermic reaction which converts a syngas into a hydrocarbon using a catalyst, so it is very important to effectively remove reaction heat for a stable operation of the plant. As effective reaction types up to now, there are gas-phase synthesis processes (a fixed-bed, an entrained-bed, a fluidized-bed reactor) and a liquid-phase synthesis process (a slurry-bed reactor). Although these processes have various features, attention has recently been paid to a slurry bed liquid-phase synthesis process which is high in heat removal efficiency, and does not cause accumulation of generated high boiling point hydrocarbons onto a catalyst, or the following plugging of a reaction tube. This process is being developed energetically.

Generally, it is preferable that the activity of a catalyst be higher and higher. However, especially in the slurry-bed reactor, in order to maintain an excellent slurry fluidized state, there exists a limit in that it is necessary to set the concentration of slurry to a certain value or less. Tiherefore, making the activity of the catalyst higher becomes a very important factor in expanding the degree of freedom of process design. The activity of various F-T synthesis catalysts which have been reported up to now is at most about 1 (kg-hydrocarbon/kg-catalyst/hr) with a general index of productivity of a liquid hydrocarbon which carbon number is 5 or more. This is not high enough from the above viewpoint (refer to Non-Patent Document 1).

As one of methods for improving the activity of the catalyst, there is a report that it is effective to reduce the content of sodium in silica used as a catalyst support (refer to Non-Patent Document 2). However, in this report, there is only comparison between the catalyst which sodium content is below 0.01 mass % and the catalyst which sodium content is about 0.3 mass %, but there is no specific description that an effect is exhibited by reducing the amount of sodium content to a certain extent.

Additionally, as a result of elaborate studies to an effect of impurities, such as alkali metals and alkaline earth metals, on the activity of a catalyst, there is an example in which the activity is greatly improved as compared with a conventional catalyst by adopting a catalyst which impurity concentration is within a certain range (refer to Patent Document 1).

Additionally, generally, the particle size of the catalyst for the F-T synthesis reaction is preferably smaller from a viewpoint of lowering the possibility that the diffusion of heat or substance becomes rate-determining level. However, in the F-T synthesis reaction by the slurry-bed reactor, high boiling point hydrocarbons among hydrocarbons to be generated are accumulated within a reaction container. Therefore, the solid-liquid separating operation between the catalyst and a product is necessarily needed. Thus, when the particle size of the catalyst is too small, the problem that the efficiency of a separating operation is greatly degraded occurs. Hence, an optimal particle size range exists in the catalyst for the slurry-bed reactor, and is generally about 20 to 250 μm. As a mean particle size, 40 to 150 μm is preferable. However, as shown below, the catalyst may be broken or powdered during a reaction, and the particle size may become small. Thus, attention is required.

That is, in the F-T synthesis reaction in the slurry-bed reactor, operation is often made at a relatively high material-gas superficial velocity (0.1 m/second or more), and catalyst particles collide violently with each other during the reaction. Therefore, when the physical strength or attrition resistance (powdering resistance) is not enough, the particle size of the catalyst may decrease during a reaction, and inconvenience may be caused in the above separating operation. Moreover, a lot of water is obtained as a by-product in the F-T synthesis reaction. However, when a catalyst which has low water resistance, and is apt to cause strength reduction, breakage, and powdering due to water is used, the particle size of the catalyst may become fine during a reaction. Thus, inconvenience will be caused in the separating operation similarly to the above.

Additionally, generally, in order to have the optimal particle size as described above, the catalyst for the slurry-bed reactor is pulverized to be adjusted in particle size, and then it is provided for practical use. Meanwhile, in such a crushed catalyst, often, pre-cracking is performed and acute projections are created. Thus, the catalyst is inferior in mechanical strength or attrition resistance. Therefore, when being used for the slurry bed F-T synthesis reaction, the catalyst is broken, and is finely powdered. As a result, there is a drawback in that the separation between the high boiling point hydrocarbons to be generated and the catalyst became significantly difficult. Additionally, when porous silica is used as a catalyst support for the F-T synthesis reaction, it is widely known that a catalyst with relatively high activity is obtained. However, when adjustment of particle size by crushing has been performed, due to the reasons as described above, often, silica is low in water resistance and is apt to be broken and powdered by the existence of water as well as strength being degraded. Therefore, this often becomes a problem especially in the slurry-bed reactor.

Additionally, under a reaction atmosphere in which a water which is generated as a by-product by the F-T reaction exists in large quantities (especially under an atmosphere of high CO conversion rate), a phenomenon that catalytic activity decreases occurs and the decrease is because cobalt silicates are formed mainly at an interface between loaded cobalt that is an active metal and a silica support, or the loaded cobalt itself is oxidized or sintering occurs. This became a problem. Additionally, since this phenomenon also leads to an accelerating the deterioration rate of the catalyst with the lapse of time, i.e., reducing catalyst life, this became a factor which increases operating cost. These can be described by the wording that the water resistance of cobalt particles showing activity is low. Especially under an atmosphere where the CO conversion is high, the partial pressure of by-product water increases, and thereby, the deterioration rate increases. As a result, the above decrease in catalytic activity appears noticeably. However, even under an atmosphere where the CO conversion is not as high as 40 to 60%, progress of decrease in catalytic activity will be made at a relatively low speed according to the partial pressure of the by-product water. Accordingly, it is important to improve water resistance even on the condition that the CO conversion is relatively low from a viewpoint of the catalyst life. With respect to the inhibition of formation of cobalt silicate, and an improvement in activity, it is considered that the addition of zirconium is effective. However, in order to exhibit the effect of zirconium, a large amount of zirconium which is about half of the mass of cobalt is required, or even if a large amount of zirconium is added, the effect thereof was not satisfactory (refer to Patent Document 2).

In the light of the above, a method of decreasing the concentration of impurities in the catalyst to obtain sufficient effects without the addition of a large amount of zirconium is disclosed in Patent Document 3. In addition, use of a catalyst with the addition of a noble metal as a promoter has been considered to obtain similar effects, and a method of decreasing the concentration of impurities in the catalyst to obtain a certain level of effects even with the addition of a small amount of the noble metal is disclosed in Patent Document 4.

The factors involved in a decrease in catalytic activity may include precipitation of carbon on the surface of cobalt or at an interface between loaded cobalt and the silica support in addition to the above. By covering the surface of cobalt with a carbon component, the surface area of cobalt which can contact a material-gas will be reduced, and the catalytic activity will decrease. In addition, poisoning by a sulfur component, a nitrogen component, and so on in the material-gas, or sintering whereby a cobalt metal may agglomerate during a reaction is common.

When a catalyst which activity has decreased falls below an activity level due to the factors, it is necessary to replace or regenerate the catalyst in order to maintain the performance of a reaction process. In the slurry-bed reactor, there is a feature that the catalyst which activity has decreased can be replaced without stopping a reaction. However, if it is possible to regenerate the catalyst which activity has decreased, a replacement catalyst for maintaining reaction performance is not needed, or the amount of replacement can be reduced. Therefore, the production cost can be reduced.

Patent Document 3 shows that water resistance improves by decreasing impurities concentration in the catalyst without addition of a large amount of zirconium, and the catalyst can regenerate by supplying reducing gas containing hydrogen to the catalyst decreased in its activity. The catalyst shows high activity due to its low impurities concentration and has sufficient water resistance, and the catalyst has superior performance as a catalyst, which is able to regenerate. Furthermore, the catalyst can be produced at a relatively low cost by a general method such as the incipient wetness method.

However, since cobalt which is an active species has an activity as a metal, it is necessary to perform a reduction operation before the reaction takes place. However, under ordinary circumstances applied when producing a large amount of the catalyst on a commercial scale, reduction of cobalt become difficult because zirconium is included in the catalyst. Therefore, there is a certain limitation of the conditions producing the catalyst such that the flow rate of reducing gas is required to set in high flow rate, or the like.

PRIOR ART DOCUMENTS

Patent Documents

[Patent Document 1] Japanese Unexamined Patent Application. First Publication No. 2004-322085
[Patent Document 2]U.S. Pat. application No. 6,740,621
[Patent Document 3] Japanese Unexamined Patent Application, First Publication No. 2008-73687
[Patent Document 4] Japanese Unexamined Patent Application, First Publication No. 2007-260669

Non-Patent Document

[Non-Patent Document 1] R. Oukaci et al., Applied Catalysis A: Genaral, 186(1999) 129-144
[Non-Patent Document 2] J. Chen, Cuihua Xuebao, Vol. 21, 2000, P169-171

DISCLOSURE OF THE INVENTION

Problems to be Solved by the Invention

The invention provides a catalyst, which aims at improving the activity of a catalyst for producing a hydrocarbon from a syngas, and suppressing a decrease in activity caused by sintering, precipitation of carbons or by-product water, and can be produced relatively easily under a low limitation in producing the catalyst. The present invention provides a catalyst for producing a hydrocarbon from a syngas, which is capable of being stably used even under the condition of a high CO conversion rate where by-product water is generated in large quantities, and has a long life, a method for producing such a catalyst, a method for regenerating such a catalyst, and a method for producing a hydrocarbon using such a catalyst.

Means for Solving the Problem

The invention relates to a catalyst for F-T synthesis with high water resistance, high activity, and long life, a method for producing such a catalyst, and a method for producing a hydrocarbon by using such a catalyst. More specifically, the invention is as described in detail below.

(1) A catalyst for producing a hydrocarbon from a syngas, which comprises: one of a cobalt metal and a combination of a cobalt metal and cobalt oxides; zirconium oxides; and a noble metal; supported by a catalyst support mainly composed of silica, wherein a content of impurities of the catalyst is less than or equal to 0.15 mass %.

(2) The catalyst for producing a hydrocarbon from a syngas described in (1), wherein the impurities of the catalyst are at least one from simple substances and compounds of sodium, potassium, calcium, magnesium, and iron.

(3) The catalyst for producing a hydrocarbon from a syngas described in (1) or (2), wherein the noble metal is at least any one of rhodium, palladium, platinum, and ruthenium.

(4) The catalyst for producing a hydrocarbon from a syngas described in any one of (1) to (3), wherein the content of the impurities in the catalyst is less than or equal to 0.03 mass %.

(5) The catalyst for producing a hydrocarbon from a syngas described in any one of (1) to (4), wherein the loading amount of one of the cobalt metal and the combination of the cobalt metal and the cobalt oxides in the catalyst is 5 to 50 mass % in terms of cobalt metal, and the loading amount of the zirconium oxides is 0.03 to 0.6 in the molar ratio of Zr/Co, and the loading amount of the noble metal is less than or equal to 1 mass %.

(6) The catalyst for producing a hydrocarbon from a syngas described in any one of (1) to (5), wherein the content of alkali metals or alkaline earth metals among the impurities contained in the catalyst support is less than or equal to 0.1 mass %.

(7) The catalyst for producing a hydrocarbon from a syngas described in any one of (1) to (5), wherein the content of each of sodium, potassium, calcium, and magnesium among the impurities contained in the catalyst support is less than or equal to 0.02 mass %.

(8) The catalyst for producing a hydrocarbon from a syngas described in any one of (1) to (7), wherein the catalyst support is spherical.

(9) A method for producing the catalyst described in any one of (1) to (8) for producing a hydrocarbon from a syngas, wherein the catalyst is produced by the steps of: first, loading zirconium compounds to be supported by the catalyst support mainly composed of silica by one of an impregnation method, an incipient wetness method, a precipitation method, and an ion-exchange method, and then performing one of a drying treatment and a combination of a drying treatment and a calcination treatment after loading of the zirconium compounds; then, loading cobalt compounds and a noble metal simultaneously to be supported by the catalyst support, and performing one of a reduction treatment and a combination of a calcination treatment and a reduction treatment.

(10) A method for producing the catalyst described in any one of (1) to (8) for producing a hydrocarbon from a syngas, wherein the catalyst is produced by the steps of: first, loading zirconium compounds to be supported by the catalyst support mainly composed of silica by one of an impregnation method, an incipient wetness method, a precipitation method, and an ion-exchange method, and then performing one of a drying treatment and a combination of a drying treatment and calcination treatment after loading the zirconium compounds; second, loading cobalt compounds to be supported by the catalyst support, and then performing one of drying treatment, and a drying treatment and a calcination treatment; and then, loading a noble metal to be supported by the catalyst support, and performing one of a reduction treatment and a combination of a calcination treatment and a reduction treatment.

(11) The method for producing a catalyst for producing a hydrocarbon from a syngas described in (9) or (10), wherein the loaded zirconium compounds, cobalt compounds and noble metal, as raw materials for production in one of the impregnation method, the incipient wetness method, the precipitation method, and the ion-exchange method, contain one of alkali metals and alkaline earth metals within a range of less than or equal to 5 mass %.

(12) The method for producing a catalyst for producing a hydrocarbon from a syngas described in any one of (9) to (11), wherein the catalyst support mainly composed of silica is produced by gelating silica sol generated by mixing an alkali silicate aqueous solution and an acid aqueous solution together, subjecting the resulting product to at least any one of acid treatment and water washing treatment, and then drying it.

(13) The method for producing a catalyst for producing a hydrocarbon from a syngas described in (12), wherein water in which content of alkali metals or alkaline earth metals is less than or equal to 0.06 mass % is used in at least any one of the acid treatment and the water washing treatment after the gelation of the silica sol.

(14) The method for producing a catalyst for producing a hydrocarbon from a syngas described in (12) or (13), wherein the gelation is performed by spraying the silica sol into a gas medium or a liquid medium to mold the silica sol in a spherical shape.

(15) The method for producing a catalyst for producing a hydrocarbon from a syngas described in any one of (9) to (14), wherein the cobalt compounds and the zirconium compounds are supported by the catalyst support mainly composed of silica after the concentration of the impurities is reduced by performing cleaning by using at least any one of water, acid, and alkali.

(16) The method for producing a catalyst for producing a hydrocarbon from a syngas described in (15), wherein the cleaning uses one or both of acid and ion-exchange water.

(17) A method for producing a hydrocarbon from a syngas by using the catalyst described in any one of (1) to (8), wherein synthesis is carried out by a liquid-phase reaction in a slurry-bed reactor.

(18) The method for producing a hydrocarbon from a syngas by using the catalyst described in any one of (1) to (8), wherein synthesis is carried out by a liquid-phase reaction in a slurry-bed reactor with an external circulation system.

(19) The method for producing a hydrocarbon from a syngas described in (17) or (18), wherein, in the liquid-phase reaction, catalyst amount, material-gas supply amount, reaction temperature, and reaction pressure are adjusted, and a one-pass CO conversion is set to be between 40 and 95%.

(20) The method for producing a hydrocarbon from a syngas described in (17) or (18), wherein, in the liquid-phase reaction, catalyst amount, material-gas supply amount, reaction temperature, and reaction pressure are adjusted, and a one-pass CO conversion is set to be between 60 and 95%.

(21) A method for regenerating a catalyst which activity has decreased after a hydrocarbon is produced from a syngas by using the catalyst described in any one of (1) to (8), wherein the catalyst which activity has decreased is supplied with a regeneration gas containing hydrogen, and thereby, the catalyst and the regeneration gas are brought into contact with each other.

(22) A method for regenerating a catalyst which activity has decreased after a hydrocarbon is produced from a syngas within the reactor, which is filled with the catalyst described in any one of (1) to (8), wherein the reactor is supplied with a regeneration gas containing hydrogen, and thereby, the catalyst and the regeneration gas are brought into contact with each other.

(23) A method for regenerating a catalyst which activity has decreased after a hydrocarbon is produced from a syngas by the method described in (18), wherein any of external circulation portions is supplied with a regeneration gas containing hydrogen, and thereby, the catalyst and the regeneration gas are brought into contact with each other.

EFFECTS OF THE INVENTION

According to the invention, because of a low limitation in producing the catalyst, it is possible to provide relatively easily and stably a high-activity catalyst for F-T synthesis, which is high in water resistance, is small in a degree to which the strength and activity of the catalyst are damaged, is extremely high in stability, and is long in life, as a catalyst containing a silica support, and cobalt particles showing activity even under the condition of a high CO conversion where by-product water is generated in large quantities. Additionally, it is possible to perform regeneration even if activity decreases, and to perform the F-T synthesis reaction having high hydrocarbon productivity by use of the catalyst.

EMBODIMENTS OF THE INVENTION

Figure 1:
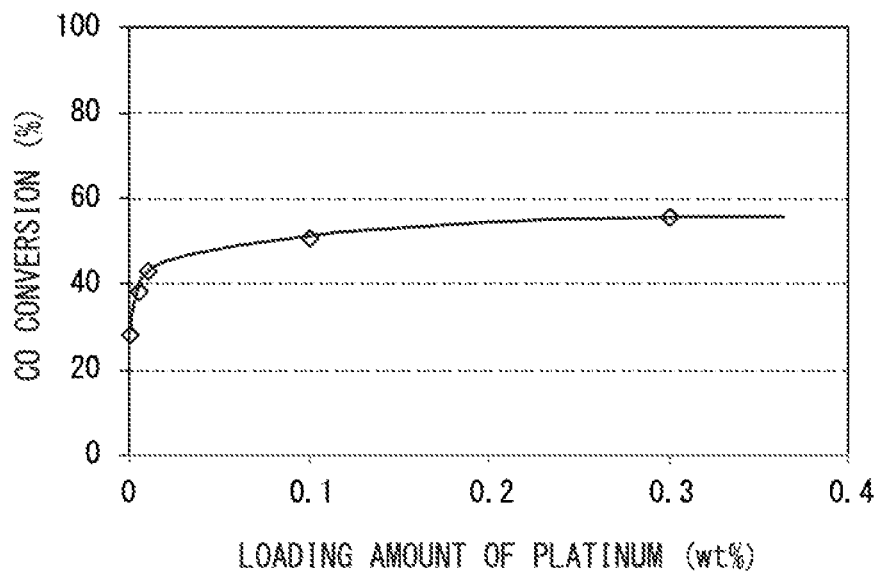
FIG. 1 is a view showing the relationship between the loading amount of platinum and the CO conversion in the reaction under the condition of the hydrogen flow rate: 1.5 mL/min per 1 g of catalyst at reduction treatment.

Hereinafter, the invention will be described in more detail.

The present inventors have found out that, when a catalyst with little or zero impurity content in which one of a cobalt metal and a combination of a cobalt metal and cobalt oxides, zirconium oxides, and a noble metal are supported by a catalyst support mainly composed of silica is compared with a catalyst with little impurity content in which one of the cobalt metal and the combination of the cobalt metal and the cobalt oxides, and the zirconium oxides are supported by the catalyst support, but the noble metal is not supported by the catalyst support, it is possible to stably and cheaply produce the catalyst due to a low limitation of producing condition such that the reducing gas flow rate is not required to be set in high flow rate in the reduction operation before the reaction takes place.

According to the above, hydrocarbons can be produced at a low cost, because the effects in which water resistance improves especially under the condition of a high CO conversion; catalyst life is also increased under the condition of a relatively low CO conversion; moreover, the catalyst activity is improved; and catalyst regeneration become easy, can be utilized effectively. That is, cobalt oxides are required to be reduced to a cobalt metal by a reduction operation before the reaction takes place, because the active specie is a cobalt metal in a cobalt-based catalyst. However, the original activity of a catalyst with little impurity content in which one of a cobalt metal and a combination of a cobalt metal and cobalt oxides, and zirconium oxides are supported by a catalyst support, but a noble metal is not supported by the catalyst support cannot be obtained, because the extent of reduction was insufficient unless a large excess flow rate of a reducing gas in a reduction operation is used. On the other hand, the original activity of the catalyst with a low or zero impurity content in which one of the cobalt metal and the combination of the cobalt metal and the cobalt oxides, the zirconium oxides, and the noble metal is supported by the catalyst support can be obtained, because the extent of reduction is sufficient without setting in a large excess flow rate of a reducing gas by the reduction-promoting effect of the noble metal.

Moreover, it was found that the effects such as the activity-improving effect, the life-extending effect, and the effect of regeneration of the catalyst easily, and which were considered as the effect of addition of the zirconium oxides in the catalyst in which one of the cobalt metal and the combination of the cobalt metal and the cobalt oxides, and the zirconium oxides are supported, increase by the addition of the noble metal. Additionally, it is possible to provide and produce a catalyst having high attrition resistance and high strength without deteriorating in activity using a spherical catalyst support having specific physical properties. In addition, the "impurities in a catalyst" in the invention also include impurities in a catalyst support mainly composed of silica.

The catalyst according to the invention is a cobalt-based catalyst having activity in the F-T synthesis reaction, and those mainly composed of silica are selected and used as the catalyst support. The "catalyst support mainly composed of silica" includes a catalyst support containing a small amount of inevitable impurities in a process for producing a silica support other than silica, or those containing alumina and/or zeolite in the catalyst support, more than or equal to 50 mass % of silica being contained, more preferably over 50 mass % of silica being contained, for example, when an acid site, in other words, an active site of a reaction performed in oil refinery such as a hydro-cracking reaction, a hydro-isomerize reaction, or the like, is introduced. (Hereinafter, the catalyst support mainly composed of silica is also simply referred to as "silica support"). In addition, the "inevitable impurities" are impurities (metals and metallic compounds) containing metals which have an effect on catalytic performance, are impurities contained in cleaning water to be used in the process for producing a silica support, are impurities contained in a starting material, and are impurities mixed from an apparatus for the catalyst production. In general, when an apparatus, a raw material, and cleaning water to be used for the F-T synthesis reaction are used, metallic elements of the impurities include sodium, potassium, calcium, magnesium, iron, and aluminum.

However, the aluminum that is an impurity element is not an inevitable impurity which has an effect on the catalytic performance in the invention because most aluminum oxides contained in silica as a starting material of the silica support exist in a form of alumina and/or zeolite in the silica support. Accordingly, the impurities in the catalyst in the present invention are sodium, potassium, calcium, magnesium, and iron when an apparatus, a raw material, and cleaning water to be used for production of a general catalyst for the F-T synthesis reaction are used. In addition, sodium and potassium are mixed into the catalyst mainly from sodium silicate to be used as a raw material for producing a silica support, calcium and magnesium are mixed into the catalyst mainly from cleaning water, and iron is mixed into the catalyst mainly from silica that is a raw material, cleaning water, or a producing apparatus. Additionally, it is also necessary to consider other impurities depending on the facilities or operating conditions of production of the catalyst so long as the impurities can be mixed.

Ruthenium, rhodium, platinum, palladium, iridium, and osmium can be used as the noble metal loaded along with cobalt and zirconium, and these noble metals can be used only one or a combination of more than one of the above metals. The addition of ruthenium, rhodium, platinum, and palladium has a large effect among the noble metals.

It is sufficient if the loading method is performed by a typical impregnation method, incipient wetness method, precipitation method, ion-exchange method, or the like. As noble metal compounds, zirconium compounds, and cobalt compounds which are a raw material (precursor) used for loading, the compounds are not particularly limited so long as their counter ions (($CH_3COO$)—) in $Co(CH_3COO)_2$, for example, in the case of acetate) are volatilized or decomposed when reduction treatment, or calcination treatment and reduction treatment is performed after loading, and they are dissolved in a solvent. Although acetates, nitrates, carbonates, chlorides, etc. can be used, it is preferable to use water-soluble compounds capable of using an aqueous solution when being loaded in order to reduce production cost or secure a safe production working environment. Specifically, since zirconium acetates, zirconium nitrates, zirconium nitrate oxides or cobalt acetates, cobalt nitrates, etc. are easily changed to zirconium oxides or cobalt oxides at the time of calcination, and the subsequent reduction treatment of the cobalt oxides is also easy, and thus, they are preferable. As the noble metal compounds, for example, tetraammine platinum nitrate, platinum nitrate, dinitrodiamine platinum, nitrosyl ruthenium nitrate, palladium nitrate, dinitrodiamine palladium, and rhodium nitrate can be used.

It is sufficient if the proper range of the loading amount of cobalt is greater than or equal to a lowest amount for exhibiting activity, and is less than or equal to a loading amount such that the degree of dispersion of supported cobalt decreases extremely, and as a result, the ratio of the cobalt which cannot contribute to a reaction increases. Specifically, the loading amount is 5 to 50 mass %/o and preferably, 10 to 40 mass %. If the loading amount falls below this range, activity cannot be exhibited satisfactorily, and if the loading amount exceeds this range, the degree of dispersion decreases, and as a result, the use efficiency of supported cobalt is degraded, and so it becomes uneconomical, which is not preferable. The "loading amount" refers to the ratio of the mass of metal cobalt to the total mass of a catalyst when it is assumed that the supported cobalt has been reduced 100% because the supported cobalt is not limited to be finally reduced 100%.

It is sufficient if the proper range of the loading amount of zirconium loaded along with cobalt and the noble metal is greater than or equal to the lowest amount for exhibiting a water resistance-improving effect, a life-extending effect, an activity-improving effect, and a regeneration-promoting effect, and is less than or equal to a loading amount such that the degree of dispersion of supported zirconium decreases extremely, and as a result, the ratio of the zirconium which does not contribute to exhibiting the effects, to the added zirconium becomes high and becomes uneconomical. Specifically, the molar ratio of cobalt to zirconium is Zr/Co=0.03 to 0.6, and preferably 0.05 to 0.3. If the loading amount falls below this range, a water resistance-improving effect, a life-extending effect, an activity-improving effect, and a regeneration-promoting effect cannot be exhibited satisfactorily, and if the loading amount exceeds this range, the use efficiency of supported zirconium is degraded, and becomes uneconomical, which is not preferable.

In order to exhibit the above-mentioned effects, it is estimated that a catalyst structure in which zirconium oxides exist on a silica support and cobalt particles showing activity exist on zirconium oxides is preferable. Cobalt particles showing activity may be cobalt particles all of which are metalized by reduction treatment, or cobalt particles most of which are metalized but a portion of which has remaining cobalt oxides thereon. It is estimated that the water resistance-improving effect is originated from suppression of oxidation of cobalt particles showing activity by the fact that it becomes easy to hold a reducing atmosphere in a reaction field where by-product water exists by virtue of the oxygen absorption ability of zirconium oxides, in addition to suppression of formation of cobalt silicates which formation is accelerated by by-product water, by reducing the interface between cobalt particles showing activity and the silica support because zirconium oxides exist on the silica support. Additionally, the interaction between zirconium oxides and cobalt particles showing activity is thought to be greater than the interaction between the silica support, and cobalt particles showing activity. Therefore, it is believed that it becomes relatively difficult for sintering to occur among cobalt particles showing activity in a catalyst in which cobalt compounds and zirconium compounds are supported, and so water resistance is improved even in an atmosphere in which the by-product water exists, in which sintering is apt to occur. Additionally, since zirconium oxides easily maintain the reducing atmosphere as described above, precipitation of carbon onto cobalt particles showing activity etc. is also suppressed. It is believed that the life-extending effect is exhibited by the fact that a catalyst structure which exhibits activity can be held longer by virtue of the above water resistance improvement, suppression of sintering, and suppression of precipitation of carbon.

Additionally, it is estimated that, since the interaction between zirconium oxides and the cobalt compounds is greater than the interaction between the silica support and the cobalt compounds, the exhibition of the activity-improving effect is originated from the fact that, when the catalyst in which cobalt compounds and zirconium compounds are supported is compared with a catalyst in which cobalt compounds, but not zirconium compounds, are supported, the degree of dispersion of cobalt is high and the active surface area is large. Additionally, it is believed that exhibition of the regeneration-promoting effect by addition of zirconium is originated from the fact that zirconium oxides easily maintain a reducing atmosphere as described above.

The proper range of the loading amount of the noble metal loaded along with cobalt and zirconium is less than or equal to 1 mass %, preferably 0.001 to 0.2 mass %, and more preferably 0.01 to 0.15 mass %. If it exceeds 1 mass %, the reduction-promoting effect of cobalt oxides to cobalt in a reduction operation is easily exhibited, but using a large amount of the noble metal which is expensive is not preferable because it becomes uneconomical. For example, the relationship between the loading amount of platinum and the CO conversion in the reaction evaluation under the condition of the hydrogen flow rate: 1.5 mL/min per 1 g of catalyst at reduction treatment is shown in FIG. 1. The CO conversion does not greatly improve in the area exceeding 0.2 mass % of the loading amount of platinum by an increase of the loading amount.

The loading of cobalt compounds, zirconium compounds, and noble metal compounds on the catalyst support mainly composed of silica can be performed by the aforementioned loading method. However, the three components can be sequentially loaded separately, two of the components are loaded simultaneously first and the remaining component is loaded thereafter, one component is loaded first and the remaining two components are loaded simultaneously, and three components are loaded simultaneously can be applied. In terms of performance of the catalyst, loading the three components separately is preferable. However, in a case of using the method of loading the three components separately, the time and the cost required to produce the catalyst increase compared with other methods. Therefore, the producing method can be selected by considering from the viewpoint of economy.

When the sequential loading of the three components is performed separately, a solution of cobalt compounds, a solution of zirconium compounds, and a solution of noble metal compounds are prepared, and loading one component of the three components on the catalyst support mainly composed of silica is first performed using any one of the solutions, and a drying treatment, or a combination of drying treatment and calcination treatment is performed. Thereafter, loading one component of the remaining two components on the catalyst support is further performed using any one of the solutions of the remaining two components, and a drying treatment, or a combination of a drying treatment and calcination treatment is performed. Then, loading the remaining component on the catalyst support is further performed using the remaining solution. After the loading, drying treatment is performed if needed, and subsequently, reduction treatment, or a combination of a calcination treatment and a reduction treatment is performed. By performing such treatments, all cobalt compounds and the noble metal are metalized, or some of cobalt compounds are oxidized and the remaining cobalt compounds are metalized, and the zirconium compounds are oxidized.

As a result of keen study, as for the loading of the cobalt compounds, zirconium compounds, and noble metal compounds on the silica support when the loading is performed separately, it is preferable that the zirconium compounds, cobalt compounds, and noble metal compounds be loaded sequentially in this order in producing a catalyst. It became apparent that the catalyst which was prepared in the other order of loading degrades the activity-improving effect, the life-extending effect, the water resistance-improving effect, and reduction-promoting effect as compared with the former catalyst. As mentioned above, it is believed that this is because zirconium oxides exhibits an improvement in activity by high dispersion of cobalt, and the function of suppressing the formation of cobalt silicates under existence of the by-product water at the interface between cobalt particles showing activity, and the silica support, and it is estimated that this is because the existence of zirconium oxides between cobalt particles showing activity, and the silica support is more effective. In addition, a reduction-promoting effect caused by the noble metal is easily exhibited when cobalt and the noble metal exist in close distance, and a contact between reducing gas and the noble metal is required to obtain the effect, and thus, it is estimated that the noble metal present in the outer surface of the catalyst support because of being loaded at the end of the order is effective.

In a similar way, when loading the remaining one component after loading two components of the three components simultaneously, a solution of the cobalt compounds, a solution of the zirconium compounds, and a solution of the noble metal compounds are prepared respectively; a mixed solution in which two components are mixed is prepared, loading of the two components in the catalyst support is performed by using the mixed solution, and a drying treatment, or a combination of a drying treatment and a calcination treatment is performed. Then, loading the remaining component is further performed by using the remaining solution. After the loading, drying treatment is performed if needed, and subsequently, reduction treatment, or combination of calcination treatment and reduction treatment is performed.

As a result of keen study, as for the loading of the cobalt compounds, zirconium compounds, and noble metal compounds on the silica support when loading the remaining component after loading any two components of the three components simultaneously, it has been found that the activity-improving effect, the life-extending effect, the water resistance-improving effect, and reduction-promoting effect are relatively large when the order of loading is, first, loading the cobalt compounds and zirconium compounds simultaneously, and then loading the noble metal compounds.

In the similar way, when loading the remaining two components simultaneously after loading any one component of the three components, preparing a solution of the cobalt compounds, a solution of the zirconium compounds, and a solution of the noble metal compounds; and loading any one component using any one of the solution in the catalyst support. Then, performing drying treatment, or a combination of drying treatment and calcination treatment, preparing a mixed solution in which remaining two components are mixed, and further loading the remaining two components using the mixed solutions. After the loading, drying treatment is performed if needed, and subsequently, reduction treatment, or a combination of calcination treatment and reduction treatment is performed.

As a result of keen study, as for the loading of the cobalt compounds, zirconium compounds, and noble metal compounds on the silica support when loading the remaining two components simultaneously after loading any one component of the three components, it has been found that the activity-improving effect, the life-extending effect, the water resistance-improving effect, and the reduction-promoting effect are relatively large when the order of loading is, first, loading the zirconium compounds, and then, loading the cobalt compounds and noble metal compounds simultaneously.

In the similar way, when loading of the three components simultaneously, a solution of the cobalt compounds, a solution of the zirconium compounds, and a solution of the noble metal compounds are prepared; a mixed solution in which three components are mixed is prepared; and loading of the three components in the catalyst support is performed by using the mixed solution. Then drying treatment, or drying treatment and calcination treatment are performed, and subsequently, reduction treatment is performed.

Since the loading operation loading the three components simultaneously is performed at one time, the operation thereof is the most economical preparing method in terms of the time and the cost. However, the activity-improving effect, the life-extending effect, the water resistance-improving effect, and reduction-promoting effect become hard to exhibit.

A fluidized-bed, a fixed-bed reactor, and a slurry-bed reactor, etc. can be applied for reduction treatment. When reduction treatment is performed before filling the catalyst in the reactor, a fluidized-bed reactor, and a fixed-bed reactor, etc. is applied in general, and when reduction treatment is performed after filling the catalyst oxides, a slurry-bed reactor is applied under the existence of a solvent. When reduction treatment by hydrogen is performed by a slurry-bed reactor, it is necessary to pay attention to the setting condition such that the reaction temperature is set to be low temperature compared with the case when the reduction treatment is performed, in a fluidized-bed, and a fixed-bed reactor so that the solvent does not be hydrocracked.

The reducing gas used for reduction treatment is not specifically limited. However, pure gas of hydrogen or carbon monoxide, is generally used. However, if the reducing gas is included, reduction proceeds by setting in a proper condition. A mixed gas containing a certain amount of these reducing gases, inert gas, and oxidized gas can be used.

Hereinafter, an example of a method for obtaining the above catalyst is shown. First, an aqueous solution of a precursor composed of zirconium compounds is impregnated and supported by a catalyst support with little impurity content mainly composed of silica, an aqueous solution of a precursor composed of the cobalt compounds is then loaded, and, drying and calcination are performed if needed, and thereafter, an aqueous solution of a precursor composed of the noble metal compounds is then loaded, drying, calcination, and reduction treatments are performed if needed, so that an F-T synthesis catalyst can be obtained. After the loading of the zirconium compounds, drying treatment (for example, at 100° C. for one hour in air) and calcination treatment (for example, at 450° C. for five hours) may be subsequently performed, or only drying treatment may be performed; and then impregnating and loading cobalt as a next step are performed. In order to keep the addition efficiency of zirconium from being degraded because zirconium compounds are incorporated into cobalt compounds during the impregnating and loading operation of cobalt, zirconium compounds may be converted into zirconium oxide by performing calcinations treatment. In the similar way, after loading cobalt compounds, drying treatment may be subsequently performed, or only drying treatment may be performed; and then impregnating and loading the noble metal as a next step are performed. However, in order to avoid the existence of the noble metal being inside the cobalt compounds and not being at the outside surface of the catalyst support, and to achieve loading the noble metal at the outer surface of the catalyst support at the end of the steps, it is preferable to convert to cobalt oxides from cobalt compounds by performing a calcination treatment after impregnating and loading of cobalt compounds after loading the cobalt compounds in the a solution of the noble metal while impregnating and loading the noble metal. An F-T synthesis catalyst is obtained by performing a drying treatment if needed, after the impregnating and loading of the noble metal compounds have been performed, and subsequently reducing the cobalt compounds on the surface of the catalyst support to the cobalt metal (for example, at 350° C. for 15 hours in a hydrogen stream at normal pressure, and with a hydrogen flow rate of 100 mL/min per 1 g of catalyst). However, reduction treatment may be performed after changing to oxides by calcination, or reduction treatment may be directly performed without calcination. In addition, in such reduction treatment, some cobalt compounds are left because they are not reduced. However, in order to exhibit excellent activity, it is preferable that the amount of cobalt compounds which are reduced to a cobalt metal, be more than the amount of cobalt compounds which are not reduced. This can be confirmed by a chemical adsorption method. It is necessary to handle the catalyst after reduction treatment so as to prevent the catalyst from being exposed to the atmosphere and then oxidized and deactivated. However, when stabilizing treatment which intercepts the surface of the cobalt metal on the catalyst support from the atmosphere is performed, the handling in the atmosphere becomes possible, which is suitable. As this stabilizing treatment, there is a method of performing so-called passivation (passivation treatment) of exposing nitrogen, carbon dioxide, and inert gas which contain low-concentration oxygen to a catalyst, thereby oxidizing only an extreme surface layer of the cobalt metal on the catalyst support, or a method of dipping it in a reaction solvent, melted FT wax. etc. when the F-T synthesis reaction is to be performed in a liquid phase, thereby intercepting them from the atmosphere. Suitable stabilizing treatment may be performed according to a situation.

Figure 2:
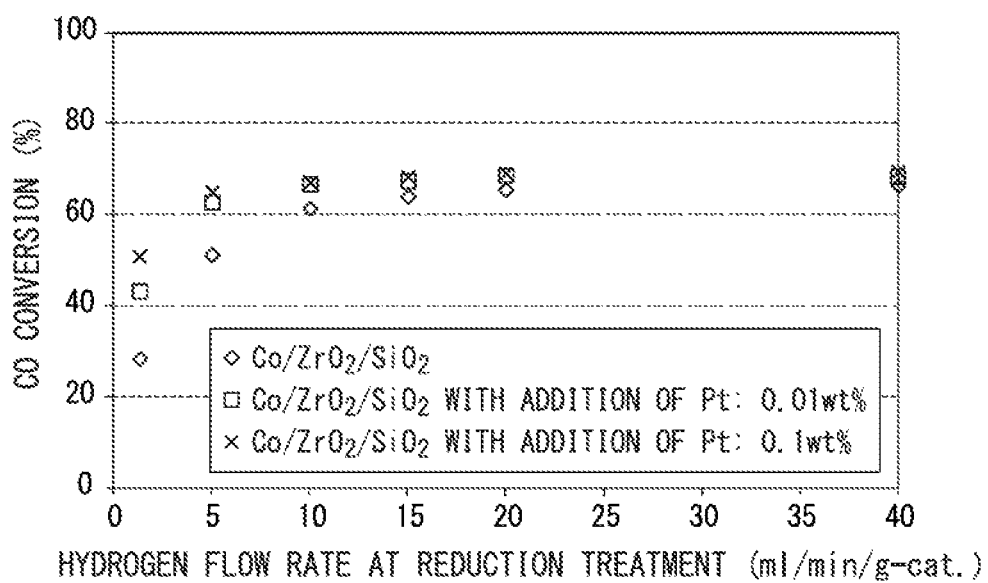
FIG. 2 is a view showing the relationship between the hydrogen flow rate per 1 g of a catalyst at reduction treatment and the CO conversion in the reaction on each catalyst.

In the example of a method for obtaining the above catalyst, hydrogen is used as a reducing gas when cobalt compounds are reduced to a cobalt metal, and the hydrogen flow rate is 100 mL/min per 1 g of catalyst which is a large excess flow rate. In such large excess flow rate of hydrogen, it depends on the temperature and the retention time, but the reduction proceeds sufficiently whether the catalyst with little impurity content in which is the cobalt metal or the combination of a cobalt metal and the cobalt oxides, and the zirconium oxides are supported, or the catalyst with low or zero impurity content in which the cobalt metal or the combination of the cobalt metal and the cobalt oxides, the zirconium oxides, and the noble metal are supported. It differs depending on the catalyst composition such as noble metal species and loading amount, and the production condition such as the temperature, and the retention time, but when hydrogen flow rate is lowered to 10 to 20 mL/min, a difference in catalytic activity and the degree of reduction starts to occur between when the noble metal is present and when the noble metal is not present, and when the hydrogen flow rate is further decreased, the difference in them increases (refer to FIG. 2: the relationship between the hydrogen flow rate at reduction of each catalyst and the CO conversion in the reaction evaluation). The typical range of the reducing gas flow rate applied in production of a large volume on a commercial scale is less than or equal to 20 mL/min per 1 g of catalyst. The preferable range of the hydrogen flow rate for the catalyst with little or zero impurity content in which the cobalt metal or the combination of the cobalt metal and the cobalt oxides, the zirconium oxides, and the noble metal are supported in the reduction treatment depends on the temperature and the retention time, but the flow rate is 0.1 to 40 mL/min per 1 g of catalyst, and more preferably 0.5 to 20 mL/min per 1 g of catalyst. In a case where the flow rate falls below 0.1 mL/min per 1 g of catalyst, the amount of the noble metal must be increased to increase the reduction-promoting effect caused by the noble metal. This is not economical, and the temperature must be increased in the reduction operation. In addition, the performance of the catalyst is decreased and additional time is required due to the occurrence of sintering of the cobalt metal and noble metal during reducing in the high temperature, and therefore, a treatment cost increases. In addition, in a case where the flow rate exceeds 40 mL/min per 1 g of the catalyst, when a large amount of excess reducing gas can be secured, sufficient catalyst activity can be obtained without the reduction-promoting effect caused by the noble metal. However, in order to try to secure the amount of reducing gas per amount of catalyst, the amount of catalyst, which can perform treatment at once, becomes relatively small, and therefore, the production cost increases and becomes uneconomical.

Figure 3:
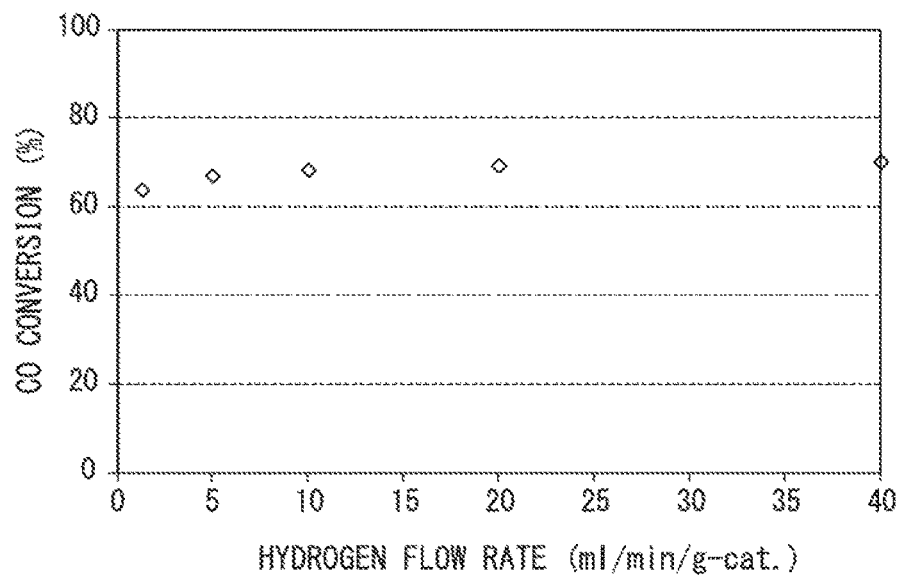
FIG. 3 is a view showing the relationship between the hydrogen flow rate at reduction treatment and the CO conversion in the reaction on Pt/Co/SiO$_2$ (Pt: 0.1 mass %) catalyst.

Patent document 4 discloses a catalyst with little impurity content in which a cobalt metal or a combination of a cobalt metal and cobalt oxides, and zirconium oxides, and a noble metal are supported by the catalyst support. However, it was not necessary to pay special attention to the hydrogen flow rate during reduction, because zirconium oxides are not contained in the catalyst (refer to FIG. 3: the relationship between the hydrogen flow rate at the reduction treatment and the CO conversion in the reaction evaluation on Pt/Co/ $SiO_2$ (Pt: 0.1 mass %) catalyst).

Here, the "catalyst with a zero impurity content" is a catalyst with an impurity content below the analysis lower limit when the impurity content is analyzed, and the "catalyst containing impurities" is a catalyst which has an impurity content of more than or equal to the analyzed lower limit value.

Additionally, in terms of an improvement in activity, life extension, and a water resistance, it is very effective to reduce impurities in a catalyst part other than active metals, and constituent elements of the catalyst support, so as to control them to certain ranges. In a case where the silica of the invention is used as a catalyst support, as described above, alkali metals, such as sodium and potassium; alkaline earth metals, such as calcium and magnesium; iron; aluminum; and so on are often contained as impurities in the silica support. When the inventors studied the influence of these impurities in detail by using cobalt as an active metal, they determined that the activity in the F-T synthesis reaction decreases greatly if an alkali metal or an alkaline earth metal exists in large amounts. Especially, the influence of the existence of sodium is the strongest.

Although impurities such as sodium, potassium, calcium, magnesium, and iron exist mainly in the form of compounds, and exist especially in the form of oxides, they may exist in small quantities in metal simple substances or forms other than oxides. In order to exhibit excellent catalytic activity and life, and high water resistance in the catalyst of the invention, it is necessary to suppress the total amount of the impurities in the catalyst to 0.15 mass % or less in terms of metal (that is, an amount in terms of metal is the weight of the metal component of the total weight of the metal component and the other components). If the total amount exceeds this amount, activity decreases greatly. Therefore, the disadvantages become significant. The total amount is preferably less than or equal to 0.04 mass % in terms of metal, and in particular, the total amount is preferably less than or equal to 0.03 mass % in terms of metal. However, if the amount of impurities is reduced unduly, an improvement in purity requires cost and becomes uneconomical. Therefore, the amount of impurities in the catalyst can be greater than or equal to 0.005 mass % in terms of metal, and is preferably greater than or equal to 0.01 mass % in terms of metal.

Since the amount of impurities also depends on a loading amount or the kind of a precursor, it is difficult to limit the amount of impurities in the precursor. However, in order to reduce the amount of impurities in the precursor of cobalt compounds and zirconium oxides as described above, and it is effective that the content of each element of alkali metals or alkaline earth metals be suppressed to 5 mass % or less in terms of metal.

Figure 4:
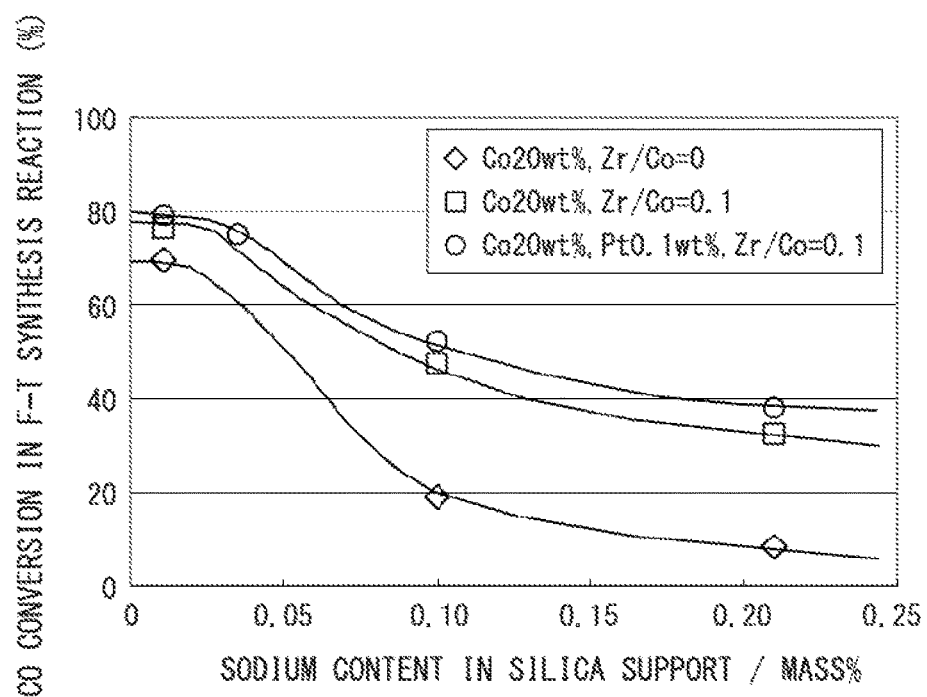
FIG. 4 is a view showing the relationship between the sodium content in the silica support and the CO conversion in the F-T synthesis reaction.
Figure 5:
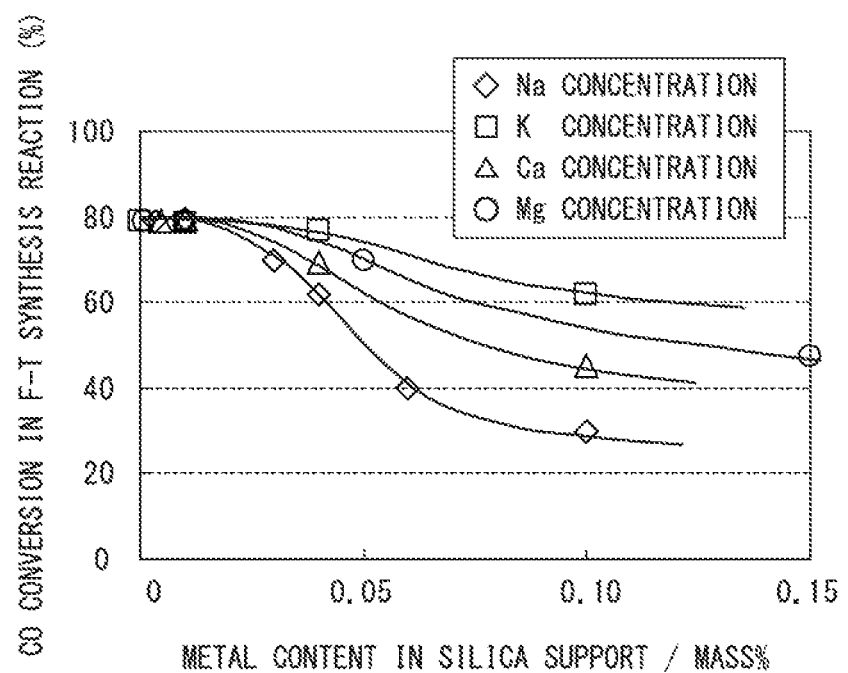
FIG. 5 is a view showing the relationship between the content of alkali metals or alkaline earth metals in the silica support and the CO conversion in the F-T synthesis reaction.

The elements which have the worst effect on the activity of a catalyst among impurities in the catalyst are alkali metals and alkaline earth metals. These metals originate from cleaning water or a starting material which is mainly used in the step of producing the silica support, and therefore, sodium, potassium, magnesium, and calcium often become problematic. FIG. 4 shows results obtained from investigating the relationship between the concentration of sodium in the silica support, and the CO conversion of the F-T synthesis reaction, as an index of catalytic activity, in a case where a catalyst contains zirconium oxides, and in a case where a catalyst does not contain zirconium. This catalyst which contains zirconium oxides is a catalyst in which zirconium compounds are first loaded, and cobalt compounds are subsequently loaded and prepared. The catalyst which contains zirconium oxides and platinum is a catalyst in which zirconium compounds, cobalt compounds, and platinum compounds are subsequently loaded in this order and prepared. As is clear from this drawing, with the catalyst containing zirconium oxides, the decrease in the CO conversion due to an increase in the concentration of sodium is relatively small, but the tendency of a change caused by the concentration of sodium does not change because of the existence/non-existence zirconium oxides contained therein. Furthermore, the tendency of the activity does not change because of the addition of platinum, and the activity increases. Additionally, FIG. 5 shows results obtained from investigating the relationship between the content of alkali metals and alkaline earth metals in the silica support, and the CO conversion in the F-T synthesis reaction as an index of catalytic activity, in a case where a catalyst does not contain zirconium oxides and the noble metal (in a case of a catalyst in which cobalt is loaded on the silica support). Within a range in which the amount of these metals in the catalyst support falls below 0.01 mass % in terms of metal, influence of the alkali metals and the alkaline earth metals is rarely seen. However, if the content exceeds 0.1 mass % in terms of metal, it can be said that activity decreases gradually. It can be estimated from FIG. 4 that the tendency of a change in the CO conversion by the concentration of the alkali metals and alkaline earth metals is the same irrespective of the existence/non-existence of zirconium oxides and the noble metal contained therein. Hence, even in the catalyst of the invention, the content of metals can also be defined to be in the same range. Accordingly, the content of each of the alkali metals or alkaline earth metals in the catalyst support is preferably less than or equal to 0.1 mass % in terms of metal, is more preferably less than or equal to 0.07 mass % in terms of metal, is still more preferably less than or equal to 0.04 mass % in terms of metal, and is especially preferably less than or equal to 0.02 mass % in terms of metal. Accordingly, in normal silica support production, the content of each of sodium, potassium, magnesium, and calcium is preferably less than or equal to 0.1 mass % in terms of metal, is more preferably less than or equal to 0.07 mass % in terms of metal, is still more preferably less than or equal to 0.04 mass % in terms of metal, and is especially preferably less than or equal to 0.02 mass % in terms of metal.

As described above, if the total amount of the impurities in the catalyst support exceeds 0.15 mass % in terms of metal, the activity of a catalyst decreases greatly. Similarly to the above, it becomes uneconomical to reduce the content of each of the alkali metals or alkaline earth metals in the catalyst support unduly. Therefore, the alkali metals or alkaline earth metals in a catalyst may be contained within a range in which they do not have an adverse effect on catalytic activity.

If the content of each of the alkali metals or alkaline earth metals in the catalyst support is reduced to about 0.01 mass % in terms of metal as described above, satisfactory effects are obtained. Therefore, it is preferable from a viewpoint of cost that the content of each element of the alkali metals or alkaline earth metals in the catalyst support be greater than or equal to 0.01 mass % in terms of metal.

In addition, a technique of flameless atomic absorption analysis after a catalyst support and a catalyst have been dissolved using hydrofluoric acid may be used as the method of measuring impurity concentration described herein. Additionally, the impurities contained in the silica support and the other impurities can be distinguished from each other by performing impurities analysis of the catalyst support only, and separately carrying out impurities analysis of the whole catalyst. For example, as for aluminum, it is possible to distinguish aluminum which exists as alumina or zeolite in the silica support from aluminum contained in portions other than the silica support. In addition, in measurement of the impurities in the silica support, the impurities can also be measured and analyzed by ICP emission spectral analysis instead of the flameless atomic absorption analysis.

If a catalyst support which can be prevented from contamination of impurities in a producing process is used, it is preferable to take a measure such that impurities are not mixed during production. Generally, the method for producing silica is roughly classified into a dry method and a wet method. As the dry method, there is a combustion method, an arc method, and so on. As the wet method, there is a precipitation method, a gel method, and so on. Although it is possible to produce a catalyst support with any producing method, it is technically or economically difficult to mold the catalyst support in a spherical shape by the above methods excluding the gel method. Therefore, the gel method which can spray silica sol in a gas medium or a liquid medium to easily mold it in a spherical shape is preferable.

For example, when the silica support is produced in the above gel method, a lot of cleaning water is usually used. In this case, if cleaning water containing much impurities, such as industrial water, is used, a lot of impurities will remain in the catalyst support, and the activity of the catalyst decreases sharply, which is not preferable. However, it becomes possible to obtain an excellent silica support with little impurity content by using cleaning water with a low content of impurities or by using cleaning water which does not contain impurities, such as ion-exchange water, at all. In this case, the content of each element of the alkali metals or alkaline earth metals in the cleaning water is preferably less than or equal to 0.06 mass % in terms of metal. If the content exceeds this, the content of impurities in the silica support increases and the activity of the catalyst after preparation decreases greatly. This is not preferable. Ideally, use of the ion-exchange water is preferable. In order to obtain the ion-exchange water, the ion-exchange water may be produced using, for example, an ion-exchange resin. However, it is also possible to produce the ion-exchange water by performing ion-exchange using silica gel to be generated as a substandard article in a production line for silica. Theoretically, trapping of the impurities in the cleaning water by silica is performed by ion-exchange between hydrogen in silanol on the surface of silica, and impurity ions, such as alkali metal ions or alkaline earth metal ions. Hence, even in the cleaning water which contains little impurities, it becomes possible to prevent trapping of impurities to some extent by adjusting pH of the cleaning water to be low. Additionally, since the amount of ion-exchange (the amount of impurity contamination) is proportional to the amount of cleaning water to be used, it becomes possible to reduce the amount of impurities in the silica support even by reducing the amount of the cleaning water, in other words, by improving the use efficiency of the water till the end of water washing.

When the impurities in the silica support can be reduced by carrying out pretreatments, such as cleaning by water, cleaning by acid, cleaning by alkali, and so on, without greatly changing the physical or chemical properties of a catalyst support, these pretreatments are very effective in an improvement in the activity of the catalyst.

For example, in cleaning of the silica support, it is especially effective to clean the silica support by acidic aqueous solutions, such as nitric acid, hydrochloric acid, and acetic acid or to clean the silica support by the ion-exchange water. After cleaning treatment by these acids, it is effective to further clean the silica support by pure water, such as the ion-exchange water when some acid remaining in the catalyst support becomes a hindrance.

Additionally, in the production of silica, calcination treatment aimed at improving particle strength, an improvement in activity of surface silanol groups, and so on is performed well. However, if the calcination is performed in a state where impurities are relatively high, it becomes difficult to reduce the content of impurities by cleaning the silica support because impurity elements are incorporated into a silica skeletal structure. Hence, in order to reduce the concentration of the impurities by cleaning the silica support, it is preferable to use a non-calcined silica gel.

By using the catalyst and the catalyst support as described above, it is possible to obtain a catalyst with significantly high activity, long life and high water resistance in the F-T synthesis reaction.

In order to keep the degree of dispersion of metal high and improve the efficiency, which contributes to the reaction of supported active metal, it is preferable to use a catalyst support of high specific surface area. However, in order to increase the specific surface area, it is necessary to reduce pore diameter and increase the pore volume. However, if these two factors are increased, since attrition resistance or strength will degrade, this is not preferable. As the physical properties of the catalyst support, a catalyst support which satisfies a pore diameter of 4 to 30 nm, a specific surface area of 60 to 550 $m^2/g$, and a pore volume of 0.2 to 1.5 mL/g simultaneously are very preferable as a catalyst support for a catalyst. If the catalyst support is one which satisfies a pore diameter of 6 to 20 nm, a specific surface area of 80 to 350 $m^2/g$ and a pore volume of 0.25 to 1.0 mL/g simultaneously, it is more preferable, and if the catalyst support is one which satisfies a pore diameter of 6 to 16 nm, a specific surface area of 100 to 300 $m^2/g$, and a pore volume of 0.3 to 0.9 mL/g simultaneously, it is still more preferable. The above-mentioned specific surface area can be measured by a BET method, and the pore volume can be measured by the mercury intrusion technique or a water titration method.

Additionally, although the pore diameter can be measured by a gas adsorption method, a mercury intrusion technique using a mercury porosimeter, and so on, it can be obtained by calculation from the specific surface area and the pore volume.

In order to obtain a catalyst which exhibits satisfactory activity for the F-T synthesis reaction, the specific surface area is required to be greater than or equal to 60 $m^2/g$. If the specific surface area falls below this, since the degree of dispersion of supported metal decreases and the efficiency of contribution of active metals to the reaction degrades, this is not preferable. Additionally, if the specific surface exceeds 550 $m^2/g$, it becomes difficult for the pore volume and the pore diameter to satisfy the above ranges simultaneously, which is not preferable.

As the pore diameter becomes small, it becomes possible to increase the specific surface area. If the pore diameter falls below 4 nm, the diffusion speed of gas in pores differs in hydrogen gas and carbon monoxide. Consequently, the partial pressure of the hydrogen becomes high toward the insides of the pores, and light hydrocarbons, such as methane, which can be called a by-product in the F-T synthesis reaction, are generated in large quantities. This is not preferable. In addition, since the diffusion rate of the generated hydrocarbons in pores also decreases, as a result, an apparent reaction rate decreases, this is not preferable. Additionally, if comparison is performed with a fixed pore volume, the specific surface area decreases as the pore diameter increases. Therefore, if the pore diameter exceeds 30 nm, since it becomes difficult to increase the specific surface area, and the degree of dispersion of active metals decreases, this is not preferable.

The pore volume is preferably within a range of 0.2 to 1.5 mL/g. If the pore volume falls below 0.2 mL/g, it becomes difficult for the pore diameter and the specific surface to satisfy the above ranges simultaneously, which is not preferable. If the pore volume is set to a value exceeding 1.5 mL/g, the strength degrades extremely, this is not preferable.

As described above, an F-T synthesis catalyst for a slurry-bed reactor reaction requires attrition resistance and strength. Additionally, since a lot of water is generated as a by-product in the F-T synthesis reaction, when a catalyst or a catalyst support which is broken and powdered under the existence of water is used, the inconveniences as mentioned above are caused, and therefore, attention is required. Hence, it is preferable to use a spherical catalyst support rather than a crushed catalyst support in which the possibility of being pre-cracked is high, and an acute corner is apt to be damaged and peeled off. When the spherical catalyst support is produced, a spraying method, such as a general spray drying method, may be used. Especially when a spherical silica support with a particle size of about 20 to 250 μm is produced, the spraying method is suitable, and a spherical silica support having excellent attrition resistance, strength, and water resistance is obtained.

A method for producing such a silica support is illustrated below. Silica sol generated under the condition that an alkali silicate aqueous solution and an acid aqueous solution are mixed together and the pH is from 2 to 10.5, is gelatinized by spraying into a gas medium, such as air, or into an organic solvent in which the sol is insoluble, and then is subjected to acid treatment, water-washed, and dried. Here, a sodium silicate aqueous solution is suitable as the alkali silicate, the molar ratio of $Na_2O:SiO_2$ is preferably 1:1 to 1:5, and the concentration of silica is preferably 5 to 30 mass %. Although nitric acid, hydrochloric acid, sulfuric acid, organic acid, and so on can be used as the acid, sulfuric acid is preferable from a viewpoint that corrosion of a container is prevented when being produced, and organic matter does not remain. The concentration of the acid is preferably 1 to 10 mol/L. If the concentration falls below this range, the progress of gelation becomes significantly slow. If the concentration exceeds this range, the gelation speed becomes too fast, and the control thereof becomes difficult. As a result, since it becomes difficult to obtain a desired property value, this is not preferable. Additionally, when a method for spraying silica sol into the organic solvent is adopted, kerosene, paraffin, xylene, toluene, etc. can be used as the organic solvent.

If the above constitution or producing method is used, it becomes possible to provide a catalyst for F-T synthesis which exhibits high activity without deteriorating strength or attrition resistance.

Additionally, by using a catalyst for F-T synthesis according to the invention, it becomes possible to perform the F-T synthesis reaction at low cost with high efficiency and to produce suitable products. That is, when the F-T synthesis reaction is performed in a liquid phase reaction using a slurry-bed reactor by using the catalyst obtained by the invention, the selectivity of liquid products which carbon number is greater than or equal to five, which are major products, is high, and the production speed of the liquid products per the unit mass of the catalyst (hydrocarbon productivity) is also very high. Furthermore, since the degree of powdering of the catalyst during use and also a decrease in activity caused by by-product water, and so on are very small, the invention has the feature that the life of the catalyst is long. From these features, it becomes possible to execute the F-T synthesis reaction at low cost with high efficiency.

If the catalyst according to the invention is used, a decrease in activity caused by by-product water, and so on is very small. Therefore, an excellent F-T synthesis reaction can be performed even under the conditions of one-pass CO conversion at which the partial pressure of the by-product water becomes very high is 60 to 95%. The "one-pass CO conversion" is the conversion of CO which is obtained only by passing a material-gas through the reactor once, which is different from the case that gas containing unreacted material-gas discharged from the reactor is re-supplied to the reactor. Even if the one-pass CO conversion is as relatively low as 40 to 60%, a decrease in activity caused by by-product water, and so on is very small. Therefore, the life of the catalyst becomes long, and it becomes possible to reduce catalyst cost. If the one-pass CO conversion becomes less than 40%, the facility cost of a tail gas recycling facility increases. Therefore, it is general that operation is performed at 40% or more.

Additionally, when a decrease in activity has occurred because the conversion is significantly high or reaction time is long, the catalyst can be regenerated by supplying gas containing hydrogen instead of syngas. As the method for regenerating a catalyst, there is an inside-reactor regenerating method which supplies a regeneration gas instead of the syngas to the reactor, thereby bringing the catalyst and the regeneration gas into contact with each other, or an outside-reactor regenerating method which extracts a catalyst or slurry containing a catalyst, and then fills a separate container called a regeneration tower with the catalyst or slurry, thereby supplying regeneration gas. Additionally, when an external circulation system in which an F-T synthesis reactor is operated while a slurry containing a catalyst is circulated to the outside of a reaction container, is adopted, an in-situ regenerating method in which regeneration gas and slurry containing a catalyst are brought into contact with each other in any of external circulation portions while an ordinary reaction is continued, can be adopted. However, even in such an operation system, the inside-reactor regenerating method and the outside-reactor regenerating method can also be employed. While the inside-reactor regenerating method has an advantage whereby a regeneration tower facility, or an in-situ regeneration facility becomes unnecessary, it has a drawback that production stops completely during the regeneration operation. Thus, it is necessary to determine a regenerating method in consideration of the cost of a regeneration tower facility or an in-situ regeneration facility, and the time required for regeneration (production stopping time), and so on. Additionally, when the in-situ regenerating method is adopted, there is an advantage that catalyst regeneration can be performed while production is continued. In addition, the in-situ regenerating method has a drawback such that the contact time between a regeneration gas and a catalyst cannot be so long or the degree of freedom of regeneration conditions is reduced slightly because it is preferable that regeneration pressure, temperature, and so on are made the same as F-T synthesis reaction conditions as mentioned below. However, this in-situ regenerating method is preferable in a case of a reaction process of an external circulation operation type using a catalyst from which a life-extending effect can be expected under regeneration conditions which can be realized in an actual process.

The hydrogen content of the regeneration gas is preferably greater than or equal to 5 vol %, and may be 100 vol %. Otherwise, the regeneration gas may contain inert gas, such as nitrogen or argon. The regeneration conditions are not particularly limited so long as they are conditions under which catalyst regeneration proceeds. As a catalyst regenerating mechanism by bringing a regeneration gas containing hydrogen and a catalyst into contact with each other, those by re-reduction of cobalt oxidized by by-product water and removal of precipitated carbon by hydrogen are inferred.

In the inside-reactor regenerating method in a slurry-bed reactor in which a catalyst is dispersed in a liquid hydrocarbon of a solvent, it is preferable to adopt regeneration conditions (temperature, pressure, time, gas flow rate, etc.) such that a solvent is not lost by the conversion of the liquid hydrocarbon into gas components by hydro-cracking or the vaporization of the liquid hydrocarbon, from a viewpoint of restarting the operation after regeneration. However, when the regeneration is performed under the conditions such that the volume of a solvent decreases, the regeneration may be performed while a solvent which has a high boiling point and does not have an adverse effect on the F-T synthesis reaction, like polyalphaolefine, is being added. When the regeneration is performed by the inside-reactor regenerating method, preferably, regeneration temperature is 100 to 400° C., regeneration pressure is normal pressure to reaction pressure, regeneration time is 5 minutes to 50 hours, and regeneration gas flow rate is such that a hydrogen flow rate in a regeneration gas is almost the same as a hydrogen flow rate in a syngas in a reaction. In the inside-reactor regenerating method, if the regeneration pressure becomes below the reaction pressure, it becomes possible to utilize a compressor for raising the reaction pressure in a reaction, and it is not necessary to install a compressor newly for regeneration. Therefore, this is advantageous from the viewpoint of facility cost.

In the in-situ regenerating method in which a catalyst in a regeneration gas and slurry are brought into contact with each other in any of external circulation portions while a reaction is continued, when regeneration temperature and pressure different from the F-T synthesis reaction conditions are adopted, a conversion facility of slurry temperature or pressure is newly needed. Therefore, facility cost will increase. Hence, it is preferable to adopt such regeneration conditions if regeneration is possible at the same pressure and temperature as the F-T synthesis reaction conditions. The regeneration gas may be introduced into any part of an external circulation line to perform regeneration. A regeneration-dedicated container may be installed such that the container is provided in the external circulation line, and a regeneration gas is introduced from a bottom of the container. However, when a container, such as a catalyst separating tank, exists in the external circulation line, it is also possible to introduce the regeneration gas into the container to perform regeneration.

In the outside-reactor regenerating method which fills a regeneration tower with an extracted catalyst and then supplies a regeneration gas, it is possible to select a fluidized-bed, a fixed-bed reactor. etc. besides the slurry-bed reactor. However, since it is not necessary to consider hydro-cracking of a solvent in a gas-solid reaction of a fluidized-bed, a fixed-bed reactor, and so on, the regeneration temperature may be determined in consideration of regeneration rate and the sintering of cobalt. Additionally, the regeneration pressure can be selected not according to the reaction pressure but according to the capability of a compressor of a regeneration facility. However, since the facility cost of the compressor increases as boosting capability increases, it is necessary to take into consideration and determine the pressure dependency of the regeneration rate.

This catalyst regeneration can perform effectively using a catalyst with little impurity content in which one of cobalt metal and a combination of cobalt metal and cobalt oxides, and zirconium oxides are supported by the catalyst support, but noble metal is not supported by the catalyst support. However, it increases in effects further by using a catalyst of the present invention with little or zero impurity content in which cobalt metal or a combination of cobalt metal and cobalt oxides, zirconium oxides, and noble metal are supported by a catalyst support.

In the same regeneration conditions, by using a catalyst which contains noble metal, the regeneration effects can be exhibited markedly and the regeneration conditions can be set mildly. That is, it becomes possible to set the regeneration temperature low, and it is possible to avoid a relatively high temperature range where hydro-cracking of a solvent occurs in slurry bed reduction, such as in-situ regeneration.

In addition, as the syngas to be used for the F-T synthesis reaction in the invention, a gas of which a sum of hydrogen and carbon monoxide is greater than or equal to 50 volume % of the total is preferable from a viewpoint of productivity, and it is particularly desirable that the molar ratio (hydrogen/carbon monoxide) of hydrogen to carbon monoxide be within a range of 0.5 to 4.0. The reason is as follows. That is, if the molar ratio of hydrogen to carbon monoxide is less than 0.5, the amount of hydrogen existing in a material-gas is too small, a hydrogenation reaction (F-T synthesis reaction) of carbon monoxide does not progress easily, and the productivity of a liquid hydrocarbon does not become high. On the other hand, if the molar ratio of hydrogen to carbon monoxide exceeds 4.0, since the amount of carbon monoxide existing in the material-gas is too small, and the productivity of a liquid hydrocarbon does not become high irrespective of catalytic activity.

EXAMPLES

Although the invention will be described in more detail by means of examples, the invention is not limited to these examples.

1 g of Co/noble metal/ZrO$_2$/SiO$_2$ catalyst which was prepared by first loading Zr by the incipient wetness method, and performing drying treatment and calcination treatment, and next by loading Co and performing drying treatment, and calcination treatment, and then, at the end of the steps, loading a noble metal and performing drying treatment, calcination treatment, reduction treatment, and passivation (the SiO$_2$ support is produced by way of cleaning using ion-exchange water, and has a spherical form with a mean particle size 100 μm, a Co loading amount of 20 to 30 mass %, Zr/Co=0 to 0.3, and a noble metal loading amount of 0.001 to 0.3 mass %), and 50 mL, of n-C$_{16}$ (n-hexadecane) were charged into an autoclave with an internal volume of 300 mL. Thereafter, F (flow rate of syngas (H$_2$/CO=2)) was adjusted so as to obtain W (catalyst mass)/F (syngas flow rate)=1.5 (g×h/mol), while an agitator was rotated at 800 min$^{-1}$ under the condition of 230° C. and 2.2 MPa-G. Then, the composition of supply gas and autoclave outlet gas was obtained by gas chromatography. Thereby, the CO conversion. CH$_4$ selectivity, CO$_2$ selectivity, and hydrocarbon productivity were obtained. In addition, in a case where the catalysts are prepared in different methods with the above, the examples of them are shown below.

Additionally, the following experiments were conducted in order to evaluate the water resistance (stability) of the catalyst.

1 g of Co/noble metal/ZrO$_2$/SiO$_2$ catalyst which was prepared by the aforementioned method, and 50 mL of n-C$_{16}$ were charged into an autoclave with an internal volume of 300 mL. Thereafter, F (flow rate of syngas (H$_2$/CO=2)) of W/F was adjusted so that the CO conversion first becomes about 70%, while an agitator was rotated at 800 min$^{-1}$ under the condition of 230° C. and 2.2 MPa-G. Then, after several hours of stable operation, F (flow rate of syngas (H$_2$/CO=2)) of W/F is adjusted so as to become approximately 90% of CO conversion. Changing back W/F to the initial W/F after 24-hour operation, and several hours of stable operation were carried out. The partial pressure of H$_2$O increases at an approximately 90% of CO conversion, and activity of a catalyst having the poorer water resistance, decreases largely.

The CO conversion, CH$_4$ selectivity, CO$_2$ selectivity, and activity retention rate described in the following examples were calculated by the formulas shown below, respectively.

$$\text{CO conversion (\%)} = \frac{(\text{CO supply amount (mol)}) - \left(\begin{array}{c}\text{CO amount in the gas} \\ \text{at the reactor outlet (mol)}\end{array}\right)}{(\text{CO supply amount (mol)})} \times 100 \quad \text{[Equation 1]}$$

$$\text{CH}_4 \text{ selectivity (\%)} = \frac{(\text{generated CH}_4 \text{ amount (mol)})}{(\text{reacted CO amount (mol)})} \times 100$$

$$\text{CO}_2 \text{ selectivity (\%)} = \frac{(\text{generated CO}_2 \text{ amount (mol)})}{(\text{reacted CO amount (mol)})} \times 100$$

$$\text{Activity retention rate (\%)} = \frac{\left(\begin{array}{c}\text{CO conversion (\%) after returning to initial} \\ \text{W/F, after holding approximately} \\ \text{90\% of CO conversion}\end{array}\right)}{(\text{initial CO conversion (\%)})} \times 100$$

HereafAer, the effects of the present invention is shown by the examples and the comparative examples. In addition, the total amount of alkali metals and alkaline earth metals in table 1 to 4 are the total amount of sodium, calcium, and magnesium. It is to be noted herein that, since potassium amount was very small as compared with these, the concentration of potassium was not described as an independent component concentration in a catalyst support in the tables. In addition, the total amount of impurities in a catalyst shows the total amount of sodium, calcium, magnesium, and iron. The method in which sequential loading in the order of zirconium compounds, cobalt compounds, and noble metal compounds is adopted unless there is a annotating in particular.

Example 1

When the FT synthesis reaction was performed using a catalyst identified as A in Table 1, the CO conversion was 56.5%, the CH$_4$ selectivity was 6.2%, the CO$_2$ selectivity was 0.3%, the productivity of a hydrocarbon with a carbon number of five or more was 1.70 (kg-hydrocarbon/kg-catalyst/hr), and the activity retention rate was 87.5%.

Example 2

The FT synthesis reaction was performed using a catalyst identified as B in Table 1. This catalyst was prepared by first loading zirconium compounds and cobalt compounds simultaneously, and then, loading noble metal compounds. The CO conversion was 49.8%, the CH$_4$ selectivity was 7.5%, the CO$_2$ selectivity was 0.2%, the productivity of a hydrocarbon which carbon number is five or more was 1.48 (kg-hydrocarbon/kg-catalyst/hr), and the activity retention rate was 72.6%.

Example 3

The FT synthesis reaction was performed using a catalyst as shown by C of Table 1. This catalyst was prepared by first loading zirconium compounds, and then, loading cobalt compounds and noble metal compounds simultaneously. The CO conversion was 54.8%, the CH$_4$ selectivity was 6.5%, the CO$_2$ selectivity was, 0.3%, the productivity of a hydrocarbon with a carbon number of five or more was 1.64 (kg-hydrocarbon/kg-catalyst/hr), and the activity retention rate was 83.3%.

Example 4

The FT synthesis reaction was performed using a catalyst identified as D in Table 1. This catalyst was prepared by loading zirconium compounds, cobalt compounds, and noble metal compounds simultaneously. The CO conversion was 48.7%, the $CH_4$ selectivity was 7.7%, the $CO_2$ selectivity was 0.2%, the productivity of a hydrocarbon with a carbon number of five or more was 1.45 (kg-hydrocarbon/kg-catalyst/hr), and the activity retention rate was 69.6%.

Example 5

When the FT synthesis reaction was performed using a catalyst identified as E in Table 1, the CO conversion was 71.1%, the $CH_4$ selectivity was 4.6%, the $CO_2$ selectivity was 0.6%, the productivity of a hydrocarbon with a carbon number of five or more was 2.16 (kg-hydrocarbon/kg-catalyst/hr), and the activity retention rate was 86.6%.

Example 6

When the FT synthesis reaction was performed using a catalyst identified as F in Table 1, the CO conversion was 71.5%, the $CH_4$ selectivity was 4.5%, the $CO_2$ selectivity was 0.6%, the productivity of a hydrocarbon which carbon number is five or more was 2.16 (kg-hydrocarbon/kg-catalyst/hr), and the activity retention rate was 86.2%.

number of five or more was 2.15 (kg-hydrocarbon/kg-catalyst/hr), and the activity retention rate was 85.9%.

Example 9

When the FT synthesis reaction was performed using a catalyst identified I in Table 2, the CO conversion was 46.5%, the $CH_4$ selectivity was 7.2%, the $CO_2$ selectivity was 0.1%, the productivity of a hydrocarbon with a carbon number of five or more was 1.37 (kg-hydrocarbon/kg-catalyst/hr), and the activity retention rate was 86.1%.

Example 10

When the FT synthesis reaction was performed using a catalyst identified as J in Table 2, the CO conversion was 70.0%, the $CH_4$ selectivity was 4.7%, the $CO_2$ selectivity was 0.6%, the productivity of a hydrocarbon with a carbon number of five or more was 2.11 (kg-hydrocarbon/kg-catalyst/hr), and the activity retention rate was 86.0%.

Example 11

When the FT synthesis reaction was performed using a catalyst identified as K in Table 2, the CO conversion was

TABLE 1

| Example | 1 | 2 | 3 | 4 | 5 | 6 |
|---|---|---|---|---|---|---|
| Catalyst | A | B | C | D | E | F |
| Na concentration in catalyst support (ppm) | 120 | 120 | 120 | 120 | 120 | 120 |
| Ca concentration in catalyst support (ppm) | 90 | 90 | 90 | 90 | 90 | 90 |
| Mg concentration in catalyst support (ppm) | 15 | 15 | 15 | 15 | 15 | 15 |
| Fe concentration in catalyst support (ppm) | 40 | 40 | 40 | 40 | 40 | 40 |
| Al concentration in catalyst support (ppm) | 70 | 70 | 70 | 70 | 70 | 70 |
| Total amount of alkali metals and alkaline earth metals in catalyst (ppm) | 143 | 143 | 143 | 143 | 143 | 143 |
| Total amount of impurities in catalyst (ppm) | 169 | 169 | 169 | 169 | 169 | 169 |
| Hydrogen flow rate at the time of reduction (ml/min/g-catalyst) | 1.5 | 1.5 | 1.5 | 1.5 | 20 | 100 |
| Co loading amount (%) | 30 | 30 | 30 | 30 | 30 | 30 |
| Molar ratio of Zr/Co | 0.1 | 0.1 | 0.1 | 0.1 | 0.1 | 0.1 |
| Noble metal loading amount (%) | Pt: 0.1 | Pt: 0.1 | Pt: 0.1 | Pt: 0.1 | Pt: 0.1 | Pt: 0.1 |
| CO conversion (%) | 56.5 | 49.8 | 54.8 | 48.7 | 71.1 | 71.5 |
| $CH_4$ selectivity (%) | 6.2 | 7.5 | 6.5 | 7.7 | 4.6 | 4.5 |
| $CO_2$ selectivity (%) | 0.3 | 0.2 | 0.3 | 0.2 | 0.6 | 0.6 |
| C5+ hydrocarbon productivity [1] (kg-hydrocarbon/kg-catalyst/hr) | 1.70 | 1.48 | 1.64 | 1.45 | 2.16 | 2.16 |
| Activity retention rate (%) | 87.5 | 72.6 | 83.3 | 69.6 | 86.6 | 86.2 |

[1] Productivity of hydrocarbon which carbon number is 5 or more

Example 7

When the FT synthesis reaction was performed using a catalyst identified as G of Table 2, the CO conversion was 50.3%, the $CH_4$ selectivity was 7.0%, the $CO_2$ selectivity was 0.2%, the productivity of a hydrocarbon with a carbon number of five or more was 1.49 (kg-hydrocarbon/kg-catalyst/hr), and the activity retention rate was 86.7%.

Example 8

When the FT synthesis reaction was performed using a catalyst identified as H in Table 2, the CO conversion was 70.7%, the $CH_4$ selectivity was 4.6%, the $CO_2$ selectivity was 0.6%, the productivity of a hydrocarbon with a carbon 55.9%, the $CH_4$ selectivity was 6.5%, the $CO_2$ selectivity was 0.2%, the productivity of a hydrocarbon with a carbon number of five or more was 1.67 (kg-hydrocarbon/kg-catalyst/hr), and the activity retention rate was 87.4%.

Example 12

When the FT synthesis reaction was performed using a catalyst identified as L in Table 2, the CO conversion was 71.0%, the $CH_4$ selectivity was 4.9%, the $CO_2$ selectivity was 0.5%, the productivity of a hydrocarbon with carbon number of five or more was 2.15 (kg-hydrocarbon/kg-catalyst/hr), and the activity retention rate was 86.4%.

TABLE 2

| Example | 7 | 8 | 9 | 10 | 11 | 12 |
|---|---|---|---|---|---|---|
| Catalyst | G | H | I | J | K | L |
| Na concentration in catalyst support (ppm) | 120 | 120 | 120 | 120 | 120 | 120 |
| Ca concentration in catalyst support (ppm) | 90 | 90 | 90 | 90 | 90 | 90 |
| Mg concentration in catalyst support (ppm) | 15 | 15 | 15 | 15 | 15 | 15 |
| Fe concentration in catalyst support (ppm) | 40 | 40 | 40 | 40 | 40 | 40 |
| Al concentration in catalyst support (ppm) | 70 | 70 | 70 | 70 | 70 | 70 |
| Total amount of alkali metals and alkaline earth metals in catalyst (ppm) | 143 | 143 | 143 | 143 | 143 | 143 |
| Total amount of impurities in catalyst (ppm) | 169 | 169 | 169 | 169 | 169 | 169 |
| Hydrogen flow rate at the time of reduction (ml/min/g-catalyst) | 1.5 | 20 | 1.5 | 20 | 1.5 | 20 |
| Co loading amount (%) | 30 | 30 | 30 | 30 | 30 | 30 |
| Molar ratio of Zr/Co | 0.1 | 0.1 | 0.1 | 0.1 | 0.1 | 0.1 |
| Noble metal loading amount (%) | Pt: 0.01 | Pt: 0.01 | Pt: 0.005 | Pt: 0.005 | Pd: 0.1 | Pd: 0.1 |
| CO conversion (%) | 50.3 | 70.7 | 46.5 | 70.0 | 55.9 | 71.0 |
| $CH_4$ selectivity (%) | 7.0 | 4.6 | 7.2 | 4.7 | 6.5 | 4.9 |
| $CO_2$ selectivity (%) | 0.2 | 0.6 | 0.1 | 0.6 | 0.2 | 0.5 |
| C5+ hydrocarbon productivity [1] (kg-hydrocarbon/kg-catalyst/hr) | 1.49 | 2.15 | 1.37 | 2.11 | 1.67 | 2.15 |
| Activity retention rate (%) | 86.7 | 85.9 | 86.1 | 86.0 | 87.4 | 86.4 |

[1] Productivity of hydrocarbon which carbon number is 5 or more

Example 13

When the FT synthesis reaction was performed using a catalyst identified as M in Table 3, the CO conversion was 54.7%, the $CH_4$ selectivity was 6.8%, the $CO_2$ selectivity was 0.2%, the productivity of a hydrocarbon with a carbon number of five or more was 1.63 (kg-hydrocarbon/kg-catalyst/hr), and the activity retention rate was 85.5%.

Example 14

When the FT synthesis reaction was performed using a catalyst identified as N in Table 3, the CO conversion was 70.7%, the $CH_4$ selectivity was 4.5%, the $CO_2$ selectivity was 0.7%, the productivity of a hydrocarbon with a carbon number of five or more was 2.14 (kg-hydrocarbon/kg-catalyst/hr), and the activity retention rate was 85.9%.

Example 15

When the FT synthesis reaction was performed using a catalyst identified as O in Table 3, the CO conversion was 53.8%, the $CH_4$ selectivity was 7.0%, the $CO_2$ selectivity was 0.1%, the productivity of a hydrocarbon with a carbon number of five or more was 1.61 (kg-hydrocarbon/kg-catalyst/hr), and the activity retention rate was 89.2%.

Example 16

When the FT synthesis reaction was performed using a catalyst identified as P in Table 3, the CO conversion was 73.2%, the $CH_4$ selectivity was 4.2%, the $CO_2$ selectivity was 0.7%, the productivity of a hydrocarbon with a carbon number of five or more was 2.23 (kg-hydrocarbon/kg-catalyst/hr), and the activity retention rate was 89.0%.

Example 17

When the FT synthesis reaction was performed using a catalyst identified as Q in Table 3, the CO conversion was 47.5%, the $CH_4$ selectivity was 7.2%, the $CO_2$ selectivity was 0.1%, the productivity of a hydrocarbon with a carbon number of five or more was 1.42 (kg-hydrocarbon/kg-catalyst/hr), and the activity retention rate was 84.6%.

Example 18

When the FT synthesis reaction was performed using a catalyst identified as R in Table 3, the CO conversion was 61.8%, the $CH_4$ selectivity was 5.7%, the $CO_2$ selectivity was 0.4%, the productivity of a hydrocarbon with a carbon number of five or more was 1.87 (kg-hydrocarbon/kg-catalyst/hr), and the activity retention rate was 85.9%.

TABLE 3

| Example | 13 | 14 | 15 | 16 | 17 | 18 |
|---|---|---|---|---|---|---|
| Catalyst | M | N | O | P | Q | R |
| Na concentration in catalyst support (ppm) | 120 | 120 | 120 | 120 | 120 | 120 |
| Ca concentration in catalyst support (ppm) | 90 | 90 | 90 | 90 | 90 | 90 |
| Mg concentration in catalyst support (ppm) | 15 | 15 | 15 | 15 | 15 | 15 |
| Fe concentration in catalyst support (ppm) | 40 | 40 | 40 | 40 | 40 | 40 |

TABLE 3-continued

| Example | 13 | 14 | 15 | 16 | 17 | 18 |
|---|---|---|---|---|---|---|
| Al concentration in catalyst support (ppm) | 70 | 70 | 70 | 70 | 70 | 70 |
| Total amount of alkali metals and alkaline earth metals in catalyst (ppm) | 143 | 143 | 143 | 143 | 170 | 170 |
| Total amount of impurities in catalyst (ppm) | 169 | 169 | 169 | 169 | 201 | 201 |
| Hydrogen flow rate at the time of reduction (ml/min/g-catalyst) | 1.5 | 20 | 1.5 | 20 | 1.5 | 20 |
| Co loading amount (%) | 30 | 30 | 30 | 30 | 20 | 20 |
| Molar ratio of Zr/Co | 0.1 | 0.1 | 0.1 | 0.1 | 0.1 | 0.1 |
| Noble metal loading amount (%) | Rh: 0.1 | Rh: 0.1 | Ru: 0.1 | Ru: 0.1 | Pt: 0.1 | Pt: 0.1 |
| CO conversion (%) | 54.7 | 70.7 | 53.8 | 73.2 | 47.5 | 61.8 |
| $CH_4$ selectivity (%) | 6.8 | 4.5 | 7.0 | 4.2 | 7.2 | 5.7 |
| $CO_2$ selectivity (%) | 0.2 | 0.7 | 0.1 | 0.7 | 0.1 | 0.4 |
| C5+ hydrocarbon productivity [1] (kg-hydrocarbon/kg-catalyst/hr) | 1.63 | 2.14 | 1.61 | 2.23 | 1.42 | 1.87 |
| Activity retention rate (%) | 85.5 | 85.9 | 89.2 | 89.0 | 84.6 | 85.9 |

[1] Productivity of hydrocarbon which carbon number is 5 or more

Example 19

When the FT synthesis reaction was performed using a catalyst identified as S in Table 4, the CO conversion was 38.1%, the $CH_4$ selectivity was 8.2%, the $CO_2$ selectivity was 0.1%, the productivity of a hydrocarbon with a carbon number of five or more was 1.13 (kg-hydrocarbon/kg-catalyst/hr), and the activity retention rate was 86.4%.

Example 20

When the FT synthesis reaction was performed using a catalyst identified as T in Table 4, the CO conversion was 69.5%, the $CH_4$ selectivity was 4.6%, the $CO_2$ selectivity was 0.5%, the productivity of a hydrocarbon with a carbon number of five or more was 2.09 (kg-hydrocarbon/kg-catalyst/hr), and the activity retention rate was 86.5%.

Example 21

When the FT synthesis reaction was performed using a catalyst identified as U in Table 4, the CO conversion was 63.8%, the $CH_4$ selectivity was 5.1%, the $CO_2$ selectivity was 0.4%, the productivity of a hydrocarbon with a carbon number of five or more was 1.93 (kg-hydrocarbon/kg-catalyst/hr), and the activity retention rate was 87.7%.

Example 22

When the FT synthesis reaction was performed using a catalyst identified as V in Table 4, the CO conversion was 70.6%, the $CH_4$ selectivity was 4.4%, the $CO_2$ selectivity was 0.6%, the productivity of a hydrocarbon with a carbon number of five or more was 2.15 (kg-hydrocarbon/kg-catalyst/hr), and the activity retention rate was 87.6%.

Example 23

When the FT synthesis reaction was performed using a catalyst identified as W of Table 4, the CO conversion was 55.7%, the $CH_4$ selectivity was 6.4%, the $CO_2$ selectivity was 0.3%, the productivity of a hydrocarbon with a carbon number of five or more was 1.67 (kg-hydrocarbon/kg-catalyst/hr), and the activity retention rate was 88.5%.

Example 24

When the FT synthesis reaction was performed using a catalyst identified by X in Table 4, the CO conversion was 69.9%, the $CH_4$ selectivity was 4.6%, the $CO_2$ selectivity was 0.6%, the productivity of a hydrocarbon with a carbon number of five or more was 2.11 (kg-hydrocarbon/kg-catalyst/hr), and the activity retention rate was 87.9%.

TABLE 4

| Example | 19 | 20 | 21 | 22 | 23 | 24 |
|---|---|---|---|---|---|---|
| Catalyst | S | T | U | V | W | X |
| Na concentration in catalyst support (ppm) | 120 | 120 | 120 | 120 | 120 | 120 |
| Ca concentration in catalyst support (ppm) | 90 | 90 | 90 | 90 | 90 | 90 |
| Mg concentration in catalyst support (ppm) | 15 | 15 | 15 | 15 | 15 | 15 |
| Fe concentration in catalyst support (ppm) | 40 | 40 | 40 | 40 | 40 | 40 |
| Al concentration in catalyst support (ppm) | 70 | 70 | 70 | 70 | 70 | 70 |
| Total amount of alkali metals and alkaline earth metals in catalyst (ppm) | 143 | 143 | 143 | 143 | 115 | 115 |
| Total amount of impurities in catalyst (ppm) | 169 | 169 | 168 | 168 | 135 | 135 |
| Hydrogen flow rate at the time of reduction (ml/min/g-catalyst) | 1.5 | 20 | 1.5 | 20 | 1.5 | 20 |
| Co loading amount (%) | 30 | 30 | 30 | 30 | 30 | 30 |
| Molar ratio of Zr/Co | 0.1 | 0.1 | 0.1 | 0.1 | 0.3 | 0.3 |

TABLE 4-continued

| Example | 19 | 20 | 21 | 22 | 23 | 24 |
|---|---|---|---|---|---|---|
| Noble metal loading amount (%) | Pt: 0.001 | Pt: 0.001 | Pt: 0.3 | Pt: 0.3 | Pt: 0.1 | Pt: 0.1 |
| CO conversion (%) | 38.1 | 69.5 | 63.8 | 70.6 | 55.7 | 69.9 |
| $CH_4$ selectivity (%) | 8.2 | 4.6 | 5.1 | 4.4 | 6.4 | 4.6 |
| $CO_2$ selectivity (%) | 0.1 | 0.5 | 0.4 | 0.6 | 0.3 | 0.6 |
| C5+ hydrocarbon productivity [1] (kg-hydrocarbon/kg-catalyst/hr) | 1.13 | 2.09 | 1.93 | 2.15 | 1.67 | 2.11 |
| Activity retention rate (%) | 86.4 | 86.5 | 87.7 | 87.6 | 88.5 | 87.9 |

[1] Productivity of hydrocarbon which carbon number is 5 or more

Example 25

The catalyst shown in A of Table 1 and 50 mL of n-$C_{16}$ were charged into an autoclave with an internal volume of 300 mL. Thereafter, F (flow rate of syngas ($H_2$/CO=2)) of W/F was adjusted so that the CO conversion first becomes about 70%, while an agitator is rotated at 800 $min^{-1}$ under the condition of 230° C. and 2.0 MPa-G. Then, after several hours of stable operation, F (flow rate of syngas ($H_2$/CO=2)) of W/F was adjusted so that the CO conversion becomes approximately 90%. Then, after 24-hours operation in this state, W/F was returned to the initial W/F, and furthermore, by performing several hours of stable operation, a decrease in activity was confirmed under the condition of a high water partial pressure in approximately 90% of the CO conversion. Thereafter, catalyst regeneration was performed in-situ by maintaining pressure, and lowering the temperature to 150° C., and supplying hydrogen at 100 mL/min. After maintaining this state for 30 hours, the F-T synthesis reaction was performed by supplying the syngas so as to obtain the first W/F, and raising temperature to 230° C.

The first CO conversion was 71.8%, the CO conversion rate when being set to the first W/F again after a decrease in activity at high W/F was 62.8%, and the CO conversion after regeneration by hydrogen was 68.5%. Although the activity decreased and the CO conversion decreased 9.0% by exposing the catalyst to a high W/F condition, the CO conversion was recovered 5.7% by the regeneration by hydrogen.

Comparative Example 1

When the FT synthesis reaction was performed using a catalyst identified as Y in Table 5, the CO conversion was 30.2%, the $CH_4$ selectivity was 8.4%, the $CO_2$ selectivity was 0.2%, the productivity of a hydrocarbon with a carbon number of five or more was 0.84 (kg-hydrocarbon/kg-catalyst/hr), and the activity retention rate was 86.8%.

Comparative Example 2

When the FT synthesis reaction was performed using a catalyst identified as Z in Table 5, the CO conversion was 18.8%, the $CH_4$ selectivity was 9.2%, the $CO_2$ selectivity was 0.8%, the productivity of a hydrocarbon with a carbon number of five or more was 0.51 (kg-hydrocarbon/kg-catalyst/hr), and the activity retention rate was 85.8%.

Comparative Example 3

When the FT synthesis reaction was performed using a catalyst identified as AA in Table 5, the CO conversion was 67.8%, the $CH_4$ selectivity was 4.8%, the $CO_2$ selectivity was 0.4%, the productivity of a hydrocarbon with a carbon number of five or more was 2.04 (kg-hydrocarbon/kg-catalyst/hr), and the activity retention rate was 77.6%.

Comparative Example 4

When the FT synthesis reaction was performed using a catalyst identified as AB in Table 5, the CO conversion was 72.5%, the $CH_4$ selectivity was 4.5%, the $CO_2$ selectivity was 0.7%, the productivity of a hydrocarbon with a carbon number of five or more was 2.18 (kg-hydrocarbon/kg-catalyst/hr), and the activity retention rate was 78.1%.

Comparative Example 5

When the FT synthesis reaction was performed using a catalyst identified as AC in Table 5, the CO conversion was 18.5%, the $CH_4$ selectivity was 9.5%, the $CO_2$ selectivity was 0.9%, the productivity of a hydrocarbon with a carbon number of five or more was 0.50 (kg-hydrocarbon/kg-catalyst/hr), and the activity retention rate was 80.3%.

Comparative Example 6

When the FT synthesis reaction was performed using a catalyst identified as AD in Table 5, the CO conversion was 29.8%, the $CH_4$ selectivity was 8.7%, the $CO_2$ selectivity was 0.7%, the productivity of a hydrocarbon with a carbon number of five or more was 0.82 (kg-hydrocarbon/kg-catalyst/hr), and the activity retention rate was 81.0%.

Comparative Example 7

Except for using the catalyst identified Y in Table 5, an experiment similar to Example 25 was performed. The first CO conversion was 70.3%, the CO conversion after a decrease in activity at high W/F was 60.3%, and the CO conversion after regeneration by hydrogen was 65.1%. Although the activity decreased and the CO conversion decreased 10.0% by exposing the catalyst to a high W/F condition, the CO conversion was recovered 4.8% by the regeneration by hydrogen.

TABLE 5

| Comparative Example | 1 | 2 | 3 | 4 | 5 | 6 |
|---|---|---|---|---|---|---|
| Catalyst | Y | Z | AA | AB | AC | AD |
| Na concentration in catalyst support (ppm) | 120 | 120 | 120 | 120 | 2150 | 2150 |
| Ca concentration in catalyst support (ppm) | 90 | 90 | 90 | 90 | 300 | 300 |
| Mg concentration in catalyst support (ppm) | 15 | 15 | 15 | 15 | 80 | 80 |
| Fe concentration in catalyst support (ppm) | 40 | 40 | 40 | 40 | 60 | 60 |
| Al concentration in catalyst support (ppm) | 70 | 70 | 70 | 70 | 90 | 90 |
| Total amount of alkali metals and alkaline earth metals in catalyst (ppm) | 143 | 171 | 157 | 157 | 1,610 | 1,610 |
| Total amount of impurities in catalyst (ppm) | 169 | 201 | 185 | 185 | 1,648 | 1,648 |
| Hydrogen flow rate at the time of reduction (ml/min/g-catalyst) | 1.5 | 1.5 | 1.5 | 20 | 1.5 | 20 |
| Co loading amount (%) | 30 | 20 | 30 | 30 | 30 | 30 |
| Molar ratio of Zr/Co | 0.1 | 0.1 | — | — | 0.1 | 0.1 |
| Noble metal loading amount (%) | — | — | Pt: 0.1 | Pt: 0.1 | Pt: 0.1 | Pt: 0.1 |
| CO conversion (%) | 30.2 | 18.8 | 67.8 | 72.5 | 18.5 | 29.8 |
| CH$_4$ selectivity (%) | 8.4 | 9.2 | 4.8 | 4.5 | 9.5 | 8.7 |
| CO$_2$ selectivity (%) | 0.2 | 0.8 | 0.4 | 0.7 | 0.9 | 0.7 |
| C5+ hydrocarbon productivity [1] (kg-hydrocarbon/kg-catalyst/hr) | 0.84 | 0.51 | 2.04 | 2.18 | 0.50 | 0.82 |
| Activity retention rate (%) | 85.8 | 84.8 | 76.6 | 77.1 | 79.3 | 80.0 |

[1] Productivity of hydrocarbon which carbon number is 5 or more

FIELD OF INDUSTRIAL APPLICATION

According to the invention, because of a low limitation in producing the catalyst, it is possible to relatively easily and stably provide a high-activity catalyst for F-T synthesis, which has a high water resistance, is small in the degree to which the strength and activity of the catalyst are damaged, is extremely high in stability, and has a long life, as a catalyst containing a silica support, and cobalt particles showing activity even under the condition of a high CO conversion where by-product water is generated in large quantities. Additionally, it is possible to perform regeneration even if activity decreases, and to perform the F-T synthesis reaction having high hydrocarbon productivity using the catalyst.

The invention claimed is:

1. A method for producing a catalyst for producing a hydrocarbon from a syngas, the catalyst consisting of: one of a cobalt metal or a combination of a cobalt metal and cobalt oxides; zirconium oxides; a noble metal; a catalyst support containing more than 50 mass % of silica and supporting all of them; and inevitable impurities, wherein the content of the inevitable impurities is less than or equal to 0.15 mass %, the method comprising the steps of:
    loading zirconium compounds to be supported by the catalyst support by one of an impregnation method, an incipient wetness method, a precipitation method, or an ion-exchange method;
    performing one of a drying treatment or a combination of drying treatment and calcination treatment of the catalyst support after loading of the zirconium compounds;
    loading cobalt compounds and the noble metal simultaneously to be supported by the catalyst support; and then
    performing one of a reduction treatment or a combination of a calcination treatment and a reduction treatment of the catalyst support after loading of the cobalt compounds and the noble metal, whereby the zirconium oxides exist on the catalyst support, the cobalt metal exists on the zirconium oxides, and the noble metal is present in an outer surface of the catalyst,
    wherein in the reduction treatment, a hydrogen flow rate as a reducing gas is 0.1 to 40 mL/min per 1 g of catalyst.

2. The method for producing a catalyst for producing a hydrocarbon from a syngas according to claim 1, wherein the loaded zirconium compounds, cobalt compounds and noble metal, as raw materials for production used in one of the impregnation method, the incipient wetness method, the precipitation method, and the ion-exchange method, contain one of alkali metals and alkaline earth metals in a range of less than or equal to 5 mass %.

3. The method for producing a catalyst for producing a hydrocarbon from a syngas according to claim 1, wherein the catalyst support mainly composed of silica is produced by gelating silica sol generated by mixing an alkali silicate aqueous solution and an acid aqueous solution together, subjecting the resulting product to at least any of an acid treatment and a water washing treatment, and then drying it.

4. The method for producing a catalyst for producing a hydrocarbon from a syngas according to claim 3, wherein water in which content of alkali metals or alkaline earth metals is less than or equal to 0.06 mass % is used in at least one of the acid treatment and the water washing treatment after the gelation of the silica sol.

5. The method for producing a catalyst for producing a hydrocarbon from a syngas according to claim 3, wherein the gelation is performed by spraying the silica sol into a gas medium or a liquid medium to mold the silica sol into a spherical shape.

6. The method for producing a catalyst for producing a hydrocarbon from a syngas according to claim 1, wherein the cobalt compounds and the zirconium compounds are supported by the catalyst support mainly composed of silica after the concentration of the impurities is reduced by performing cleaning by using at least any one of water, acid, and alkali.

7. The method for producing a catalyst for producing a hydrocarbon from a syngas according to claim 6, wherein the cleaning uses one or more of acid and ion-exchange water.

8. The method for producing a catalyst for producing a hydrocarbon from a syngas according to claim 1, wherein a flow rate of a reducing gas is 0.5 to 20 mL/min per 1 g of catalyst.

9. The method for producing a catalyst for producing a hydrocarbon from a syngas according to claim 8, wherein a flow rate of a reducing gas is 0.5 to 10 mL/min per 1 g of catalyst.

10. The method for producing a catalyst for producing a hydrocarbon from a syngas according to claim 1, wherein the loading amount of one of the cobalt metal and the combination of the cobalt metal and the cobalt oxides in the catalyst is 5 to 50 mass % in terms of cobalt metal, and the loading amount of the zirconium oxides is 0.03 to 0.6 in the molar ratio of Zr/Co, and the loading amount of the noble metal is less than or equal to 1 mass %.

11. The method for producing a catalyst for producing a hydrocarbon from a syngas according to claim 10, wherein the loading amount of the noble metal is 0.001 to 0.2 mass %.

12. A method for producing a catalyst for producing a hydrocarbon from a syngas, the catalyst consisting of: one of a cobalt metal or a combination of a cobalt metal and cobalt oxides; zirconium oxides; a noble metal; a catalyst support containing more than 50 mass % of silica and supporting all of them; and inevitable impurities, wherein the content of the inevitable impurities is less than or equal to 0.15 mass %, the method comprising the steps of:
    loading zirconium compounds to be supported by the catalyst support by one of an impregnation method, an incipient wetness method, a precipitation method, or an ion-exchange method;
    performing one of a drying treatment or a combination of drying treatment and calcination treatment of the catalyst support after loading of the zirconium compounds;
    loading cobalt compounds to be supported by the catalyst support;
    performing one of a drying treatment or a combination of a drying treatment and calcination treatment of the catalyst support after loading of the cobalt compounds;
    loading the noble metal to be supported by the catalyst support; and then
    performing one of a reduction treatment or a combination of calcination treatment and reduction treatment of the catalyst support after loading of the noble metal, whereby the zirconium oxides exist on the catalyst support, the cobalt metal exists on the zirconium oxides, and the noble metal is present in an outer surface of the catalyst,
    wherein in the reduction treatment, a hydrogen flow rate as a reducing gas is 0.1 to 40 mL/min per 1 g of catalyst.

13. The method for producing a catalyst for producing a hydrocarbon from a syngas according to claim 12, wherein the loaded zirconium compounds, cobalt compounds and noble metal, as raw materials for production used in one of the impregnation method, the incipient wetness method, the precipitation method, and the ion-exchange method, contain one of alkali metals and alkaline earth metals in a range of less than or equal to 5 mass %.

14. The method for producing a catalyst for producing a hydrocarbon from a syngas according to claim 12, wherein the catalyst support mainly composed of silica is produced by gelating silica sol generated by mixing an alkali silicate aqueous solution and an acid aqueous solution together, subjecting the resulting product to at least any of an acid treatment and a water washing treatment, and then drying it.

15. The method for producing a catalyst for producing a hydrocarbon from a syngas according to claim 14, wherein water in which content of alkali metals or alkaline earth metals is less than or equal to 0.06 mass % is used in at least one of the acid treatment and the water washing treatment after the gelation of the silica sol.

16. The method for producing a catalyst for producing a hydrocarbon from a syngas according to claim 14 wherein the gelation is performed by spraying the silica sol into a gas medium or a liquid medium to mold the silica sol into a spherical shape.

17. The method for producing a catalyst for producing a hydrocarbon from a syngas according to claim 12, wherein the cobalt compounds and the zirconium compounds are supported by the catalyst support mainly composed of silica after the concentration of the impurities is reduced by performing cleaning by using at least any one of water, acid, and alkali.

18. The method for producing a catalyst for producing a hydrocarbon from a syngas according to claim 17, wherein the cleaning uses one or more of acid and ion-exchange water.

19. The method for producing a catalyst for producing a hydrocarbon from a syngas according to claim 12, wherein a flow rate of a reducing gas is 0.5 to 20 mL/min per 1 g of catalyst.

20. The method for producing a catalyst for producing a hydrocarbon from a syngas according to claim 19, wherein a flow rate of a reducing gas is 0.5 to 10 mL/min per 1 g of catalyst.

21. The method for producing a catalyst for producing a hydrocarbon from a syngas according to claim 12, wherein the loading amount of one of the cobalt metal and the combination of the cobalt metal and the cobalt oxides in the catalyst is 5 to 50 mass % in terms of cobalt metal, and the loading amount of the zirconium oxides is 0.03 to 0.6 in the molar ratio of Zr/Co, and the loading amount of the noble metal is less than or equal to 1 mass %.

22. The method for producing a catalyst for producing a hydrocarbon from a syngas according to claim 21, wherein the loading amount of the noble metal is 0.001 to 0.2 mass %.

* * * * *